United States Patent [19]

Satomi et al.

[11] Patent Number: 5,448,634
[45] Date of Patent: Sep. 5, 1995

[54] METHOD AND APPARATUS FOR DATA TRANSFER AND CIRCUIT SETTING FOR COMMUNICATION NETWORK SYSTEM

[75] Inventors: Shigeki Satomi, Tokyo; Naoki Ono; Mami Oka, both of Kawasaki, all of Japan

[73] Assignee: Hitachi, Ltd., Tokyo, Japan

[21] Appl. No.: 666,849

[22] Filed: Mar. 8, 1991

[30] Foreign Application Priority Data

Mar. 8, 1990 [JP] Japan .................. 2-57782
May 18, 1990 [JP] Japan .................. 2-128612

[51] Int. Cl.$^6$ .................. H04M 7/00; H04M 15/00; H04M 3/00; H04M 1/00
[52] U.S. Cl. .................. 379/220; 379/115; 379/134; 379/198; 379/357
[58] Field of Search .................. 379/111, 112, 113, 114, 379/115, 133, 134, 196, 197, 198, 219, 220, 221, 357

[56] References Cited

U.S. PATENT DOCUMENTS 3,728,486  4/1973  Kraus .................. 379/69
4,756,019  7/1988  Szybicki .................. 379/221 X
4,759,056  7/1988  Akiyama .................. 379/197
4,769,834  9/1988  Billinger et al. .................. 379/112

FOREIGN PATENT DOCUMENTS 57-32195  2/1982  Japan .
60-157364  8/1985  Japan .

Primary Examiner—James L. Dwyer
Assistant Examiner—Harry S. Hong
Attorney, Agent, or Firm—Antonelli, Terry, Stout & Kraus

[57] ABSTRACT

A method of and apparatus for controlling a data transfer by a transfer deliverer node from a terminal equipment belonging to the transfer deliverer node to another node, in a network system having a plurality of nodes connected to a public switched network and a plurality of terminal equipments connectable to a corresponding node. At each node, a discriminator specific to each terminal equipment belonging to the transfer deliverer node is registered in advance in a first memory; a discriminator specific to a user of each terminal equipment is registered in advance in a second memory for each terminal equipment belonging to the transfer deliverer node; in response to a data communication request from the terminal equipment belonging to the transfer deliverer node, the discriminator of the terminal equipment and the discriminator of a user of the terminal equipment, respectively sent from the terminal equipment, are received; it is judged if the received discriminator of the terminal equipment is being registered in the first memory; it is judged if the received discriminator of a user of the terminal equipment is being registered in the second memory as a discriminator of the user of the terminal equipment; and in response to the judgment results, it is determined if a data transfer from the terminal equipment is permitted or not.

8 Claims, 18 Drawing Sheets

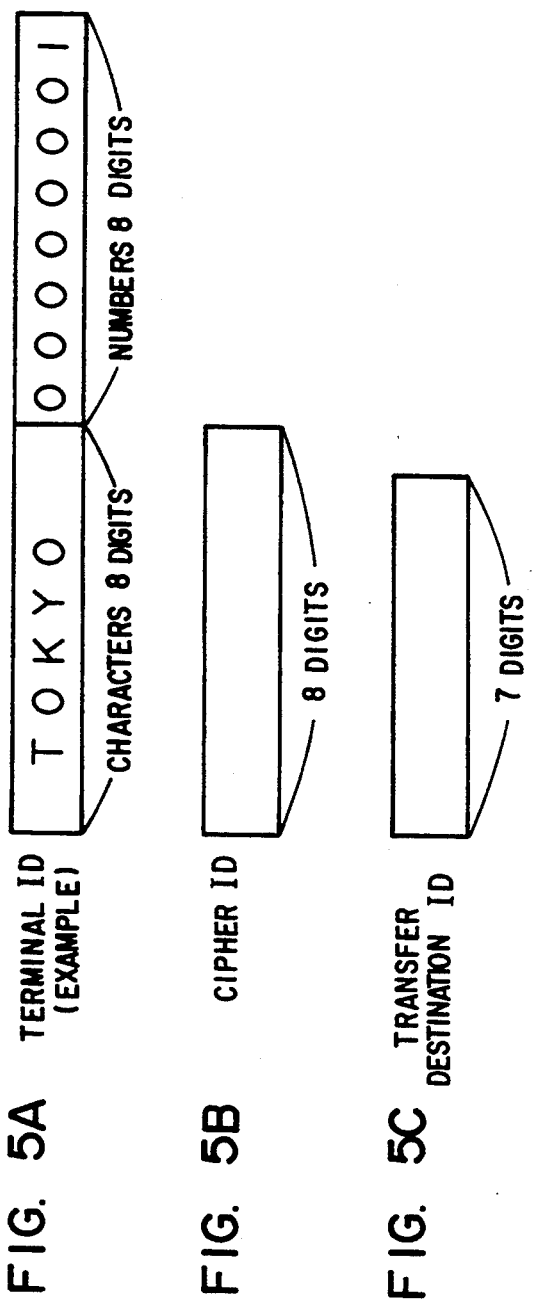

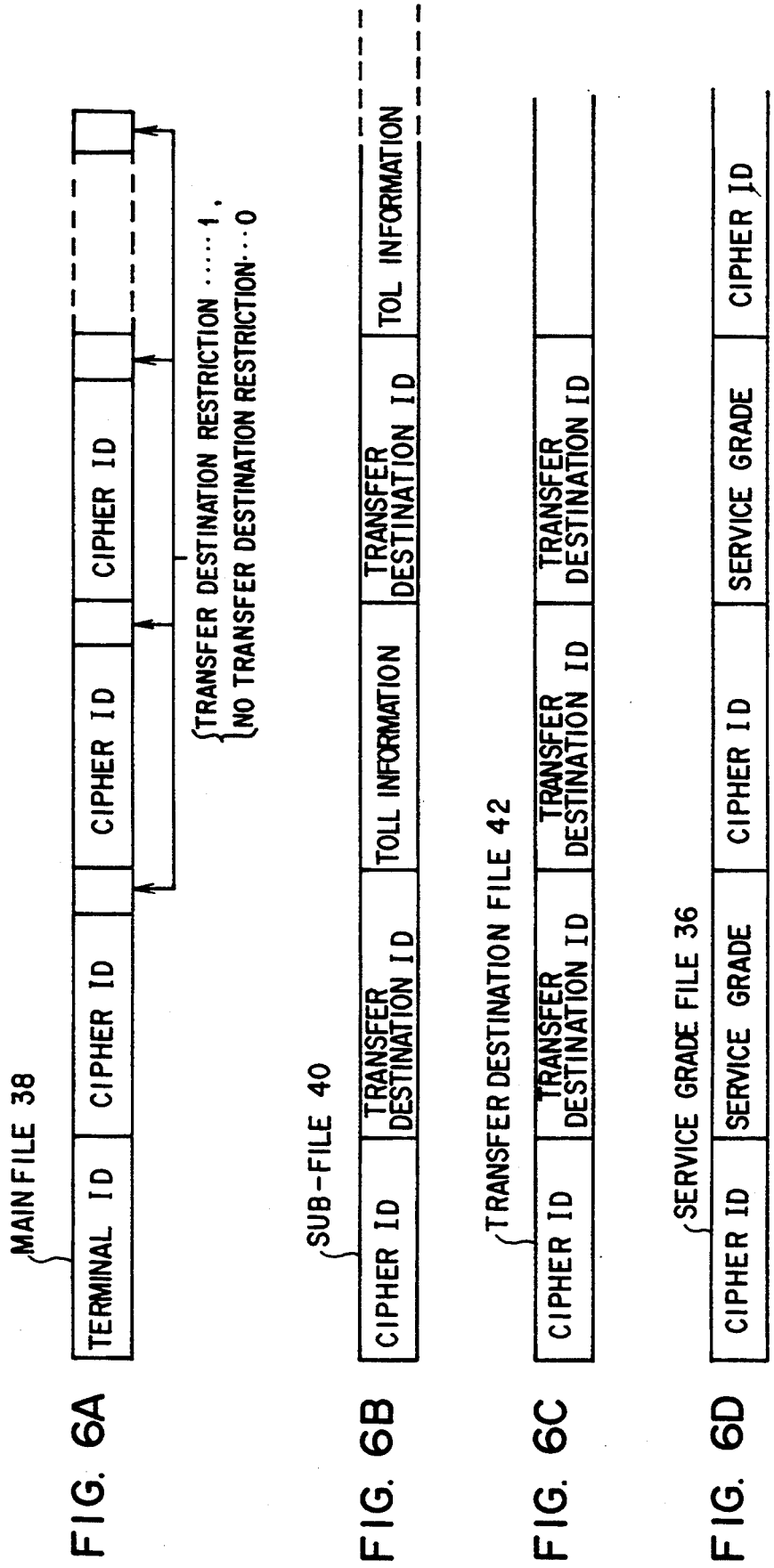

FIG. 6E

| DISTRICT<br>TOLL | A NODE 2 ↔ B NODE 4 | A NODE 2 ↔ C NODE 5 | A NODE 2 ↔ D NODE 3 |
|---|---|---|---|
| H₁ CHANNEL | 60 YEN / 4.5 SEC | | |
| H₀ CHANNEL | 30 YEN / 6 SEC | | |
| B CHANNEL | 10 YEN / 5.5 SEC | | |

FIG. 6F

| NUMBER OF SPEECH COMMUNICATION \ TIME | 0 | 1 | 2 | 3 | 4 | 5 | 6 | 7 | 8 | 9 | ... | 23 |
|---|---|---|---|---|---|---|---|---|---|---|---|---|
| A NODE 2 ↔ B NODE 4 | 0 | 0 | 0 | 0 | 0 | 0 | 1 | 1 | 3 | 48 | --- | 1 |
| A NODE 2 ↔ C NODE 5 | 1 | 0 | 0 | 0 | 0 | 0 | 1 | 2 | 4 | 51 | --- | 2 |
| A NODE 2 ↔ D NODE 3 | 0 | 0 | 0 | 0 | 0 | 0 | 2 | 4 | 7 | 70 | --- | 4 |

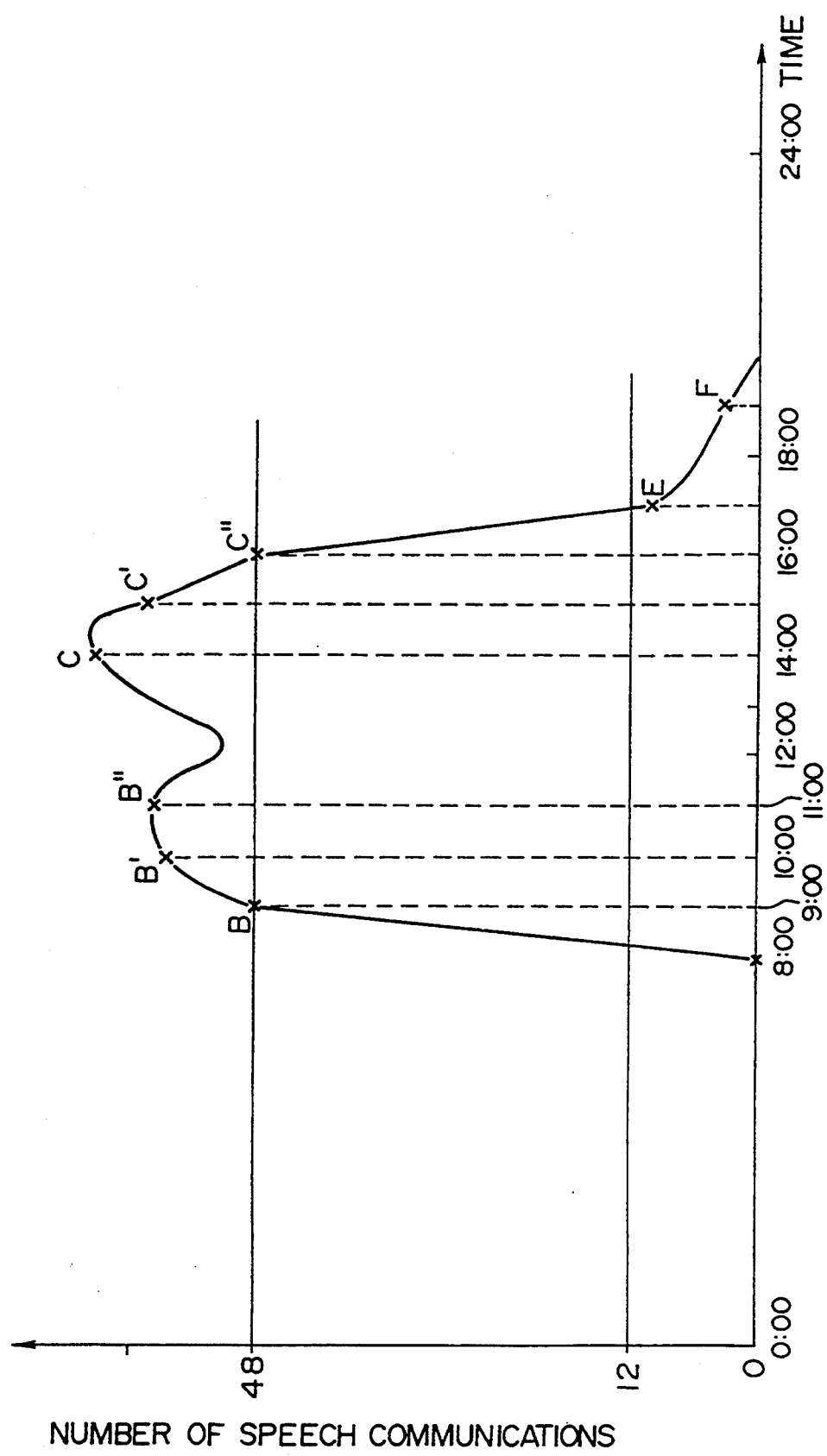

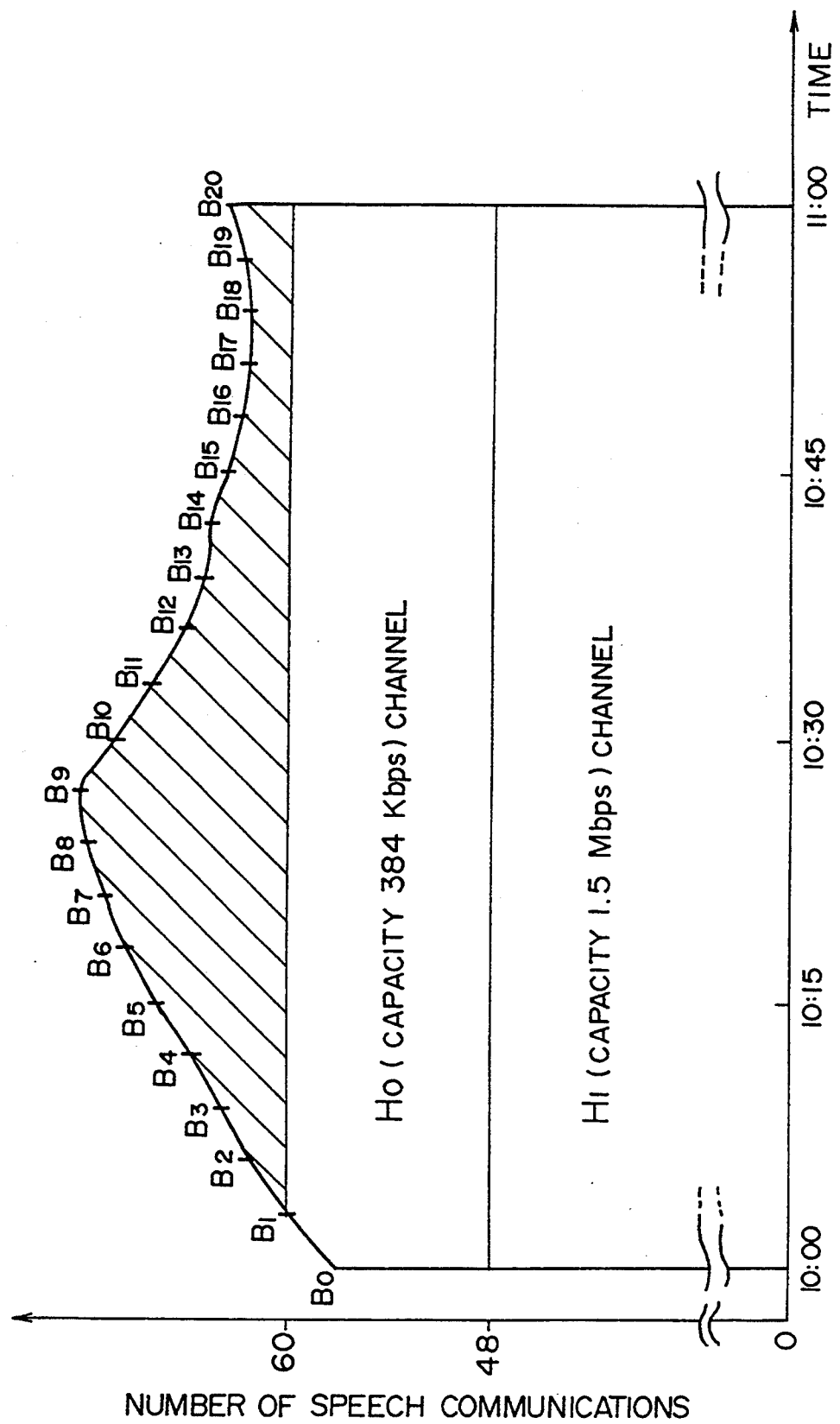

FIG. 9

| | B0 | B1 | B2 | B3 | B4 | B5 | B6 | B7 | B8 | B9 | B10 | B11 | B12 | B13 | B14 | B15 | B16 | B17 | B18 | B19 | B20 | TOTAL |
|---|---|---|---|---|---|---|---|---|---|---|---|---|---|---|---|---|---|---|---|---|---|---|
| TIME (HOUR, MINUTE) | 10:00 | 03 | 06 | 09 | 12 | 15 | 18 | 21 | 24 | 27 | 30 | 33 | 36 | 39 | 42 | 45 | 48 | 51 | 54 | 57 | 11:00 | — |
| NUMBER OF SPEECH COMMUNICATIONS | 60 | 62 | 63 | 64 | 66 | 68 | 70 | 71 | 72 | 71 | 70 | 68 | 67 | 66 | 65 | 63 | 62 | 63 | 63 | 63 | 64 | — |
| 1 NUMBER OF CIRCUITS | — | — | — | — | — | — | — | — | — | — | — | — | — | — | — | — | — | — | — | — | — | — |
| 2 NUMBER OF CIRCUITS | 0 | 1 | 2 | 2 | 3 | 4 | 5 | 6 | 6 | 6 | 5 | 4 | 4 | 3 | 3 | 2 | 1 | 2 | 2 | 2 | 2 | 65 |

1 NUMBER OF B CHANNEL CIRCUITS WHEN 1 CIRCUIT OF $H_1$ CHANNEL AND 2 CIRCUITS OF $H_0$ CHANNEL ARE SET

2 NUMBER OF B CHANNEL CIRCUITS WHEN 1 CIRCUIT OF $H_1$ CHANNEL AND 1 CIRCUIT OF $H_0$ CHANNEL ARE SET

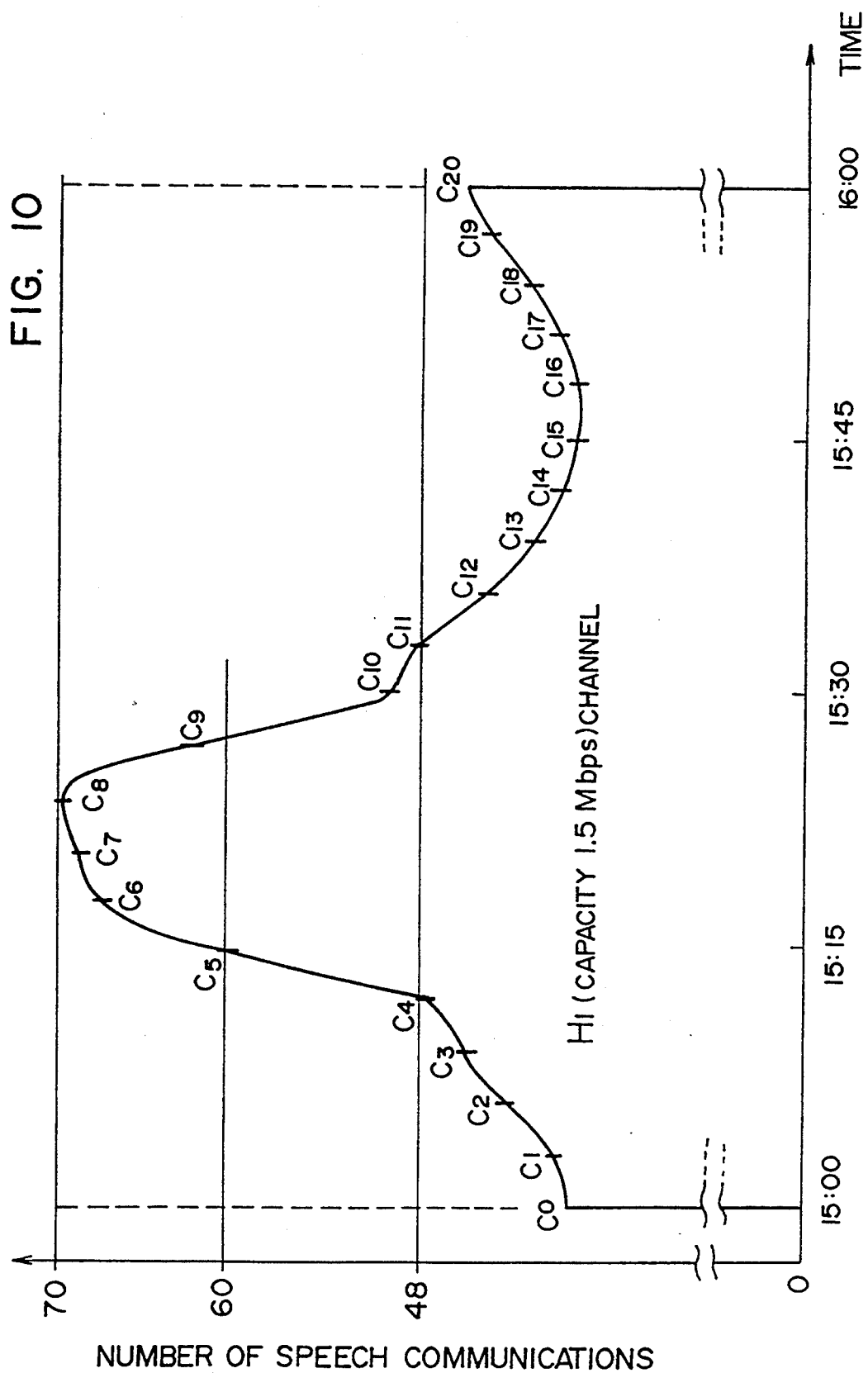

FIG. 11

| | $C_0$ | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ | $C_{18}$ | $C_{19}$ | $C_{20}$ | TOTAL |
|---|---|---|---|---|---|---|---|---|---|---|---|---|---|---|---|---|---|---|---|---|---|---|
| TIME (HOUR, MINUTE) | 15: 00 | 03 | 06 | 09 | 12 | 15 | 18 | 21 | 24 | 27 | 30 | 33 | 36 | 39 | 42 | 45 | 48 | 51 | 54 | 57 | 16: 00 | — |
| NUMBER OF SPEECH COMMUNICATIONS | 39 | 40 | 43 | 48 | 58 | 66 | 69 | 66 | 62 | 50 | 48 | 44 | 41 | 39 | 38 | 38 | 39 | 41 | 43 | 45 | | — |
| 1 NUMBER OF CIRCUITS | — | — | — | — | — | — | — | — | — | — | — | — | — | — | — | — | — | — | — | — | — | — |
| 2 NUMBER OF CIRCUITS | 0 | 0 | 0 | 0 | 3 | 5 | 5 | 3 | 1 | 0 | 0 | 0 | 0 | 0 | 0 | 0 | 0 | 0 | 0 | 0 | 0 | 17 |
| 3 NUMBER OF CIRCUITS | 0 | 0 | 0 | 5 | 9 | 11 | 11 | 9 | 7 | 1 | 0 | 0 | 0 | 0 | 0 | 0 | 0 | 0 | 0 | 0 | 0 | 53 |

1 NUMBER OF B CHANNEL CIRCUITS WHEN 1 CIRCUIT OF $H_1$ CHANNEL AND 2 CIRCUITS OF $H_0$ CHANNEL ARE SET

2 NUMBER OF B CHANNEL CIRCUITS WHEN 1 CIRCUIT OF $H_1$ CHANNEL AND 1 CIRCUIT OF $H_0$ CHANNEL ARE SET

3 NUMBER OF B CHANNEL CIRCUITS WHEN 1 CIRCUIT OF $H_1$ CHANNEL IS SET

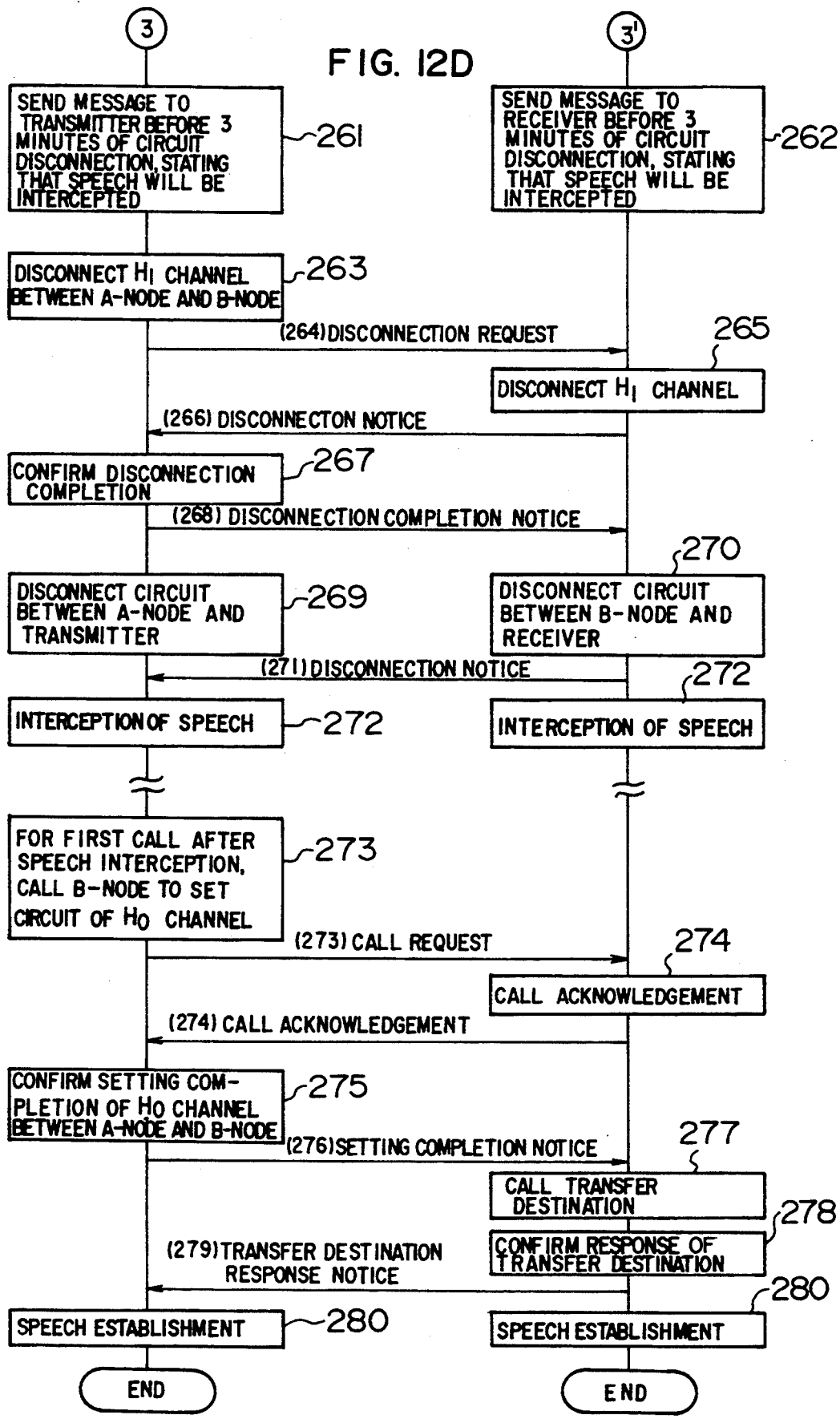

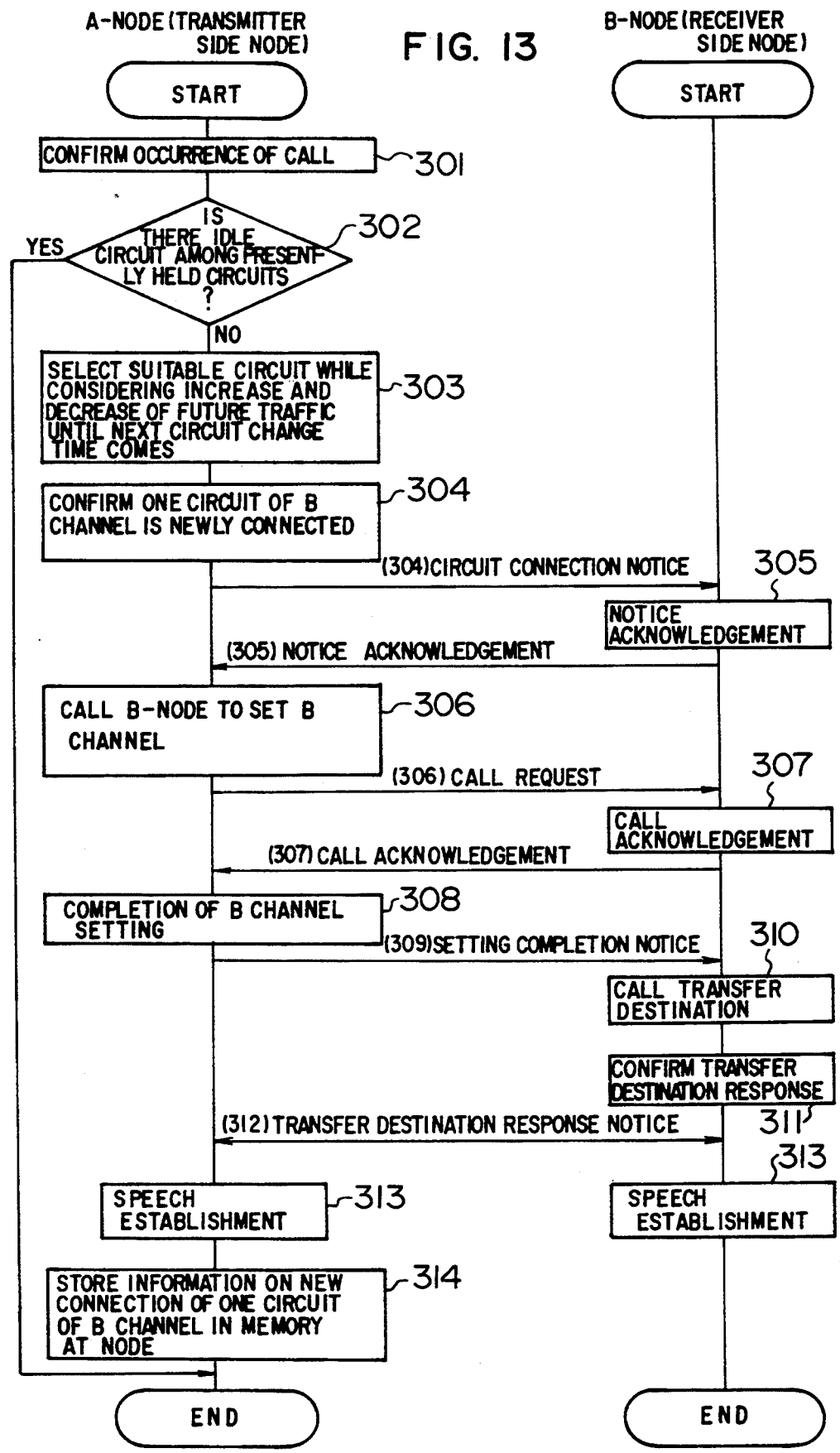

METHOD AND APPARATUS FOR DATA TRANSFER AND CIRCUIT SETTING FOR COMMUNICATION NETWORK SYSTEM

BACKGROUND OF THE INVENTION

The present invention relates to a network system having a plurality of nodes (circuit switches, packet switches, and the like) connected to a public switched network (a public electronics and communication service network such as a public switched telephone network, Integrated Services Digital Network (ISDN), and the like). More particularly, the present invention relates to a method and apparatus for the network system for providing data transfer services to a subscriber, and a method and apparatus for connecting a circuit between nodes in the network system.

For transferring data, e.g., speech by using a public switched network, there are known a transfer function of an automatic answering telephone set and so called a variable absence transfer function of a private branch exchange. According to the transfer function of an automatic answering telephone set, after a call is once received by an automatic answering telephone set (after the automatic answering telephone set responds to an external call), the telephone set transfers the call to a transfer destination previously registered, by all means irrespective of the contents of the call. According to the variable absence transfer function, a private branch exchange transfers a call to a transfer destination previously registered, by all means irrespective of who made the call. A toll for speech transfer is charged to both a subscriber sending a message (a subscriber wanting to make speech transfer) and a subscriber receiving the message (a subscriber receiving the transferred message).

The techniques of this type are described, for example, in "New Telephone Ages" by Mitsuru SUGAYA, published by Kabushiki Kaisha Data House (hereinafter called Document (1)).

For a network system having a plurality of nodes connected to a public switched network, there is known a storage type data transfer method described, for example, in Japanese Patent Laid-open Publication JP-A 57-131148 (herein after called Document (2)). According to this method, when data to be transferred is generated at a terminal equipment at a transfer deliverer node, this data is temporarily stored in a data file of this node. The transfer deliverer node sends a notice to a terminal equipment at a transfer destination node, the notice indicating that the data to be transferred has been stored. Upon reception of this notice, the terminal equipment requests the data exchange to transmit the data stored in the data file, and receives the transferred data.

The convention technique described in Document (1) does not consider a security function of a speech transfer unit (an automatic answering telephone set, a private branch exchange, and the like) for preventing and unauthorized access by identifying a subscriber wishing to receive a service of speech transfer. Therefore, the speech transfer unit supplies a speech transfer service to all types of speeches even by an unauthorized access. In addition, it does not consider a toll control function. Therefore, it is associated with the problem that a toll for speech transfer is charged to both a subscriber sending a speech and a subscriber receiving the transferred speech.

With the conventional technique described in Document (2), each time transfer data is generated, the data is temporarily stored in a data file at the transfer delivered node. A notice to this effect is sent to a transfer destination node. Upon reception of a transfer request from the transfer destination node, the node sets a circuit to transfer the data. After the data transfer, the circuit is disconnected. According to a toll system of a public switched network, a transfer fee is charged by each unit time. Therefore, if it takes, for example 3 minutes and 10 seconds to transfer data, assuming that the unit time is 3 minutes for example, the circuit is held for 6 minutes and the transfer fee for 6 minutes is charged. In other words, during the remaining 2 minutes and 50 seconds while the circuit is held, this circuit is not efficiently used.

SUMMARY OF THE INVENTION

It is therefore an object of this invention to eliminate the disadvantages of the above-described conventional techniques and provide a method and apparatus capable of supplying an improved data communication service for a communication network system using a public switched network.

It is another object of the present invention to provide an improved data transfer method and apparatus for providing a data transfer service to a subscriber to a communication service system using a public switched network, the communication service system having a plurality of nodes (circuit switching system, packet switching system) connected to the public switched network (public electronics and communication service such as a public switched telephone network and an ISDN).

It is a further object of this invention to provide a data transfer method and apparatus having a security function of reliably preventing a data transfer service to be accessed by an unauthorized party not subscribed to a communication service system having a plurality of nodes connected to a public switched network.

It is yet another object of this invention to provide an improved circuit connection method and apparatus for connecting a circuit between nodes for a communication service system having a plurality of nodes connected to a public switched network and performing data communications via nodes.

It is a still further object of the present invention to provide a circuit connection method and apparatus allowing each node to set an optimum circuit between nodes in a network system for communications via nodes having a plurality of nodes connected to a public switched network, while considering an estimated traffic between nodes and the toll system of communication circuits.

According to one aspect of the present invention there is provided a method of controlling a data transfer by a transfer deliverer node from a terminal equipment belonging to the transfer deliverer node to another node, in a network system having a plurality of nodes connected to a public switched network and a plurality of terminal equipments connectable to a corresponding node. At each node, a discriminator specific to each terminal equipment belonging to the transfer deliverer node is registered in advance in a first memory; a discriminator specific to a user of each terminal equipment is registered in advance in a second memory for each terminal equipment belonging to the transfer deliverer node; in response to a data communication request from the terminal equipment belonging to the transfer deliverer node, the discriminator of the terminal equipment and the discriminator of a user of the terminal equipment, respectively sent from the terminal equipment, are received; it is judged if the received discriminator of the terminal equipment is being registered in the first memory; it is judged if the received discriminator of a user of the terminal equipment is being registered in the second memory as a discriminator of the user of the terminal equipment; and in response to the judgment results, it is determined if a data transfer from the terminal equipment is permitted or not.

More preferably, according to this invention, a toll is charged to a subscriber (user) allowed to receive the communication service, in accordance with a toll system previously set for an amount of communication.

Specifically, according to this invention, when a connection is established to a local node via a public switched system, a terminal equipment (e.g. a telephone set with a cipher identifier (ID) generation function, a cipher ID generator etc. connected to an ordinary telephone set as an external device) used by a subscriber to this service automatically sends a specific terminal identifier (ID) assigned to the terminal equipment to the local node. The node then compares the terminal ID with a terminal ID previously registered. If the same terminal ID is not being registered, the circuit is disconnected at this stage. If the same terminal ID is being registered, the node urges the subscriber to enter a specific user ID into the terminal equipment. When the user ID is sent from the subscriber, the node compares the user ID with a cipher ID previously registered. If the same user ID is being registered, it is confirmed that the subscriber in concern is an authorized subscriber to this service, and data transfer from the terminal equipment is permitted. On the other hand, if the same user ID is not being registered, the circuit is disconnected at this stage. After the permission and completion of data transfer, a toll is charged to the subscriber in concern to this service, using the cipher ID as a key parameter for the charged toll.

In this manner, there is provided a double check function for both the terminal ID and the cipher ID. Therefore, it is possible to reliably prevent a party (accessing erroneously or without allowance) not subscribed to this service from accessing this service. On the side of a subscriber to this service, a declaration to receive this service is made by the subscriber by entering the cipher ID, so that a toll is charged to the subscriber without charging the toll to another subscriber. Furthermore, this service can be received anywhere, because a toll is charged using the cipher ID as a key parameter for the charged toll and if a cipher ID generator capable of generating both the terminal ID and the cipher ID is connected to a terminal equipment.

According to another aspect of this invention there is provided a method of setting a circuit at a transfer deliverer node for connecting the transfer deliverer node and a transfer destination node, in a network system having a plurality of nodes connected to a public switched network and a plurality of terminal equipments connectable to a corresponding node. At each node, traffic information is stored in advance in a first memory, the traffic information being representative of an estimated traffic obtained in accordance with past data transferred between the transfer deliverer node and the transfer destination node; a communication toll is registered in advance in a second memory, the communication toll being provided for each of a plurality type of circuits each having a different traffic capacity and being set between the transfer deliverer node and the transfer destination node; and a circuit is set between the transfer deliverer node and the transfer destination node, the circuit being selected from the plurality type of circuits for transferring data from a terminal equipment via the transfer deliverer node to the transfer destination node, in accordance with the traffic information and the communication toll stored in the first and second memories.

Specifically, according to this invention, each node stores in advance traffic information in a table, the traffic information being estimated from past traffic data between the node in concern and other nodes for each unit time, such as month, day, and hour. In accordance with the traffic information and a toll system of communication circuits, optimum circuits between nodes during a certain hour on a certain day are dynamically set or changed at each unit time from the viewpoints of circuit capacity and circuit toll. If all circuits presently set are busy and the traffic increases, a desired number of new circuits are set at the next circuit change time after the lapse of the unit time, while considering the estimated traffics at the next and following circuit change times.

BRIEF DESCRIPTION OF THE DRAWINGS

FIGS. 3A to 3D are flow charts showing an example of an inter node transfer process according to an embodiment of this invention;

FIGS. 5A to 5C show examples of the formats of signals transmitted from a service subscriber transmitter;

FIGS. 6A to 6D show examples of the formats of various files in a file unit for each service subscriber in the storage device of each node;

FIG. 7 shows a particular example of the traffic state of speech communications;

FIG. 8 is an enlarged view between two times B' and B" shown in FIG. 7;

FIG. 9 is a table showing the relationship between the number of circuits of the B channel relative to the number of speech communications at each time;

FIG. 10 is an enlarged view between two points C' and C" shown in FIG. 7;

FIG. 11 is a table showing the relationship between the number of circuits of the B channel relative to the number of speech communications at each unit time;

FIGS. 12A to 12D are flow charts illustrating examples of a circuit change operations by nodes at each unit time for each service grade; and FIG. 13 is a flow chart illustrating an example of the operation of setting a circuit between nodes for the case where the actual traffic becomes in excess of an estimated traffic.

DESCRIPTION OF THE PREFERRED EMBODIMENTS

Figure 1:
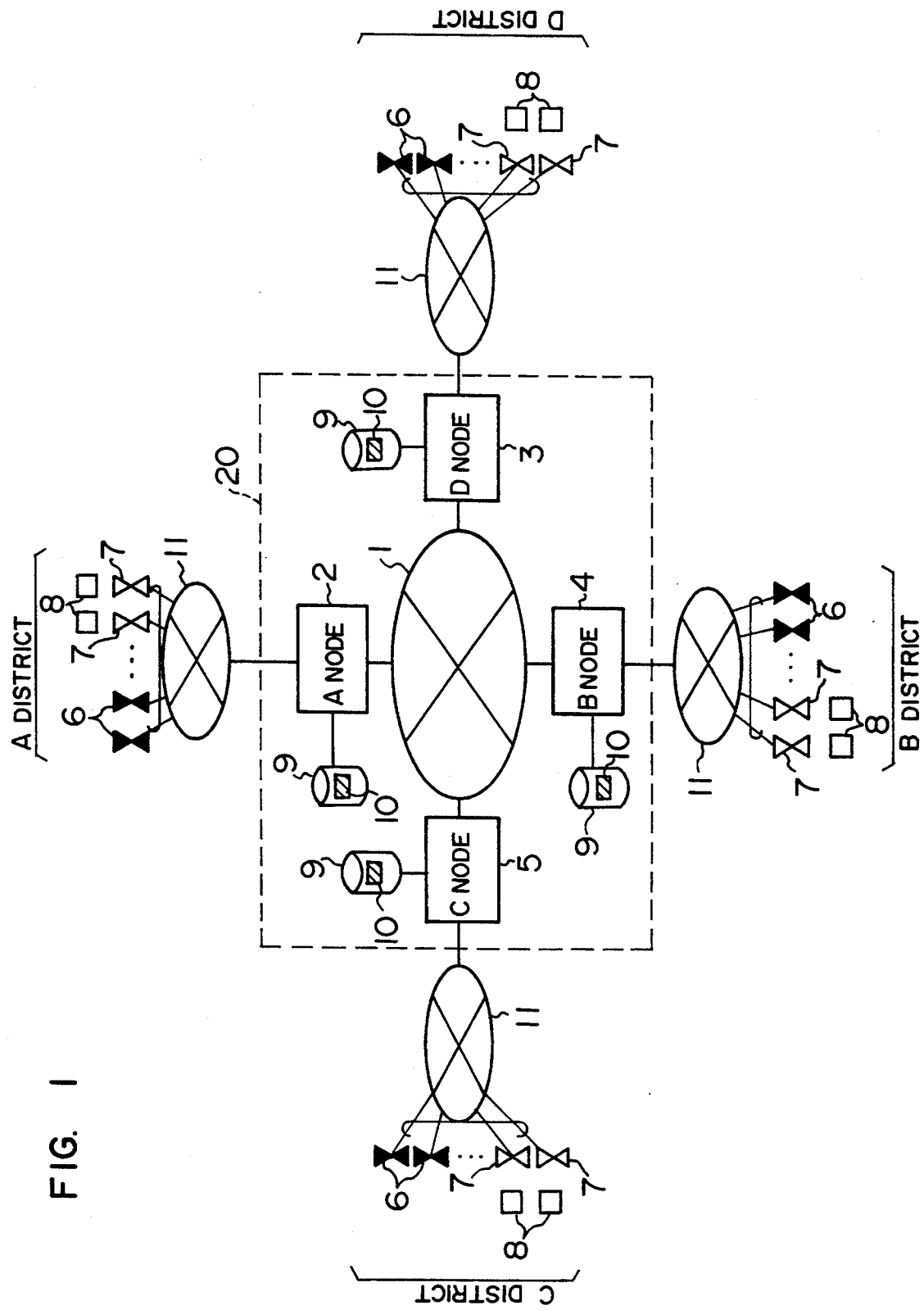
FIG. 1 is a block diagram showing an example of the structure of a communication service system using a public switched network, embodying the present invention.

Preferred embodiments of a circuit switching method and apparatus for switching circuits between nodes in a communication service system using a public switched network, and of a data transfer processing method and apparatus for system subscribers according to this invention will be described with reference to the accompanying drawings, FIG. 1 is a block diagram showing an example of the structure of a communication service system for supplying communication services to subscribers, by using a public switched system. In FIG. 1, reference numerals 1 and 11 represent a public switched network such as a public switched telephone network and an Integrated Services Digital Network (ISDN). Reference numerals 2 to 5 represent a node (including n nodes, n is an integer. In this example, n=4) connected to the public switched networks 1 and 11, the node being a circuit switching system or a packet switching system capable of data communications. Reference numeral 6 represents a terminal equipment such as a telephone set having a function to generate a cipher identifier (ID). Reference numeral 7 represents a terminal equipment such as a general telephone set. Reference numeral 8 represents an external equipment connected to the telephone set 7, the external equipment being a cipher ID generator such as a tone dialer. Reference numeral 9 represents a storage unit provided for each node. Reference numeral 10 represents a file unit of the storage unit for storing in file form the terminal ID, cipher ID, transfer destination ID, and toll information, respectively of each service subscriber. An area within a frame defined by a broken line corresponds to a service vendor, and an area outside of the frame corresponds to service subscribers.

Figure 2:
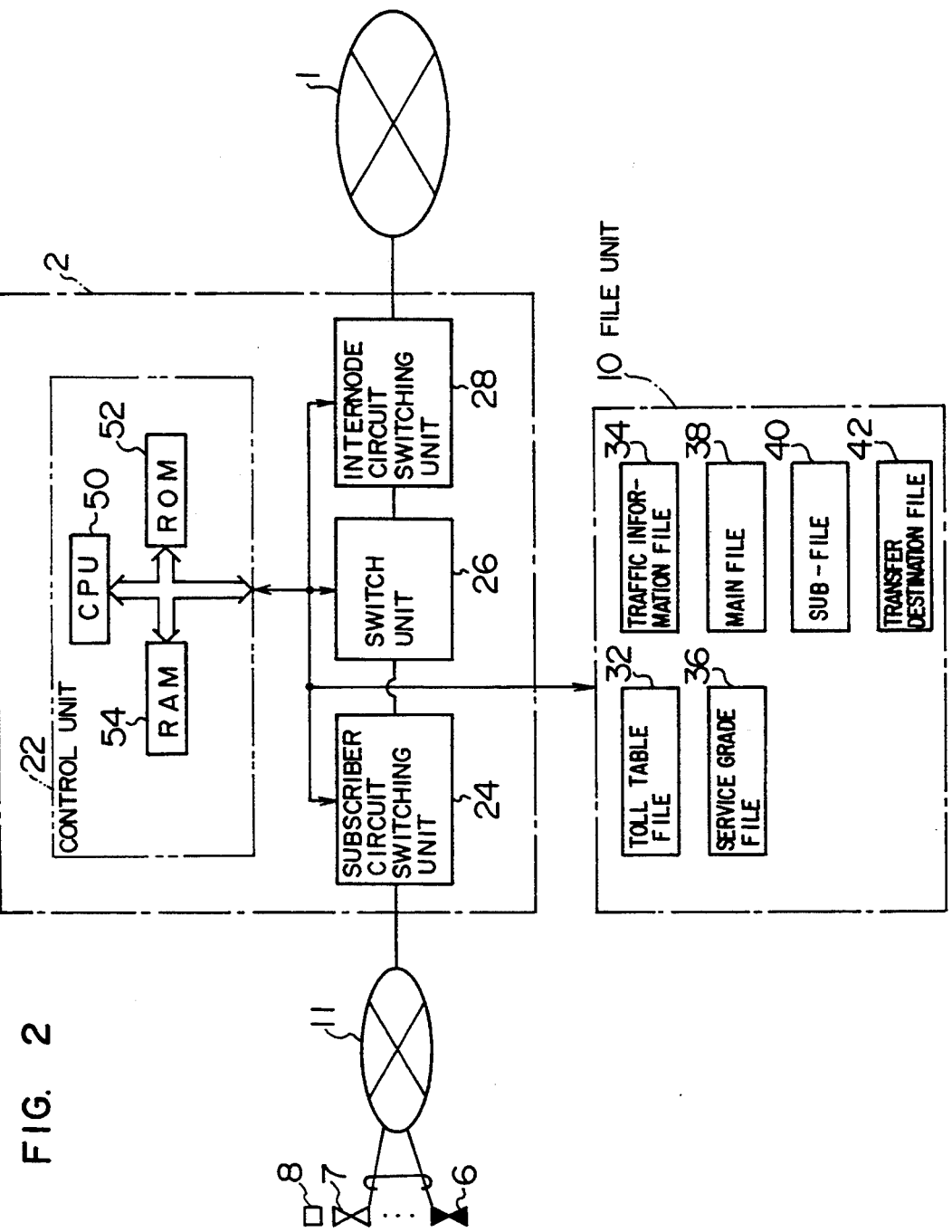
FIG. 2 is a block diagram showing an example of the structure of each node shown in FIG. 1.

FIG. 2 shows the structure of each node 2 which has a control unit 22, a subscriber (user) side circuit switching unit 24 for connecting the node in concern to a telephone set 6, 7 via the public switched network 11, a switch unit 26 connected to the subscriber side circuit switching unit 24, and an inter node circuit switching unit 28 for connecting the switch unit 26 to another node via the public switched network 1. The control unit 22 has a central processing unit (CPU) 50, a read only memory (ROM) 52, and a random access memory (RAM) 54, and executes a speech process shown in FIGS. 3A, 3B, and 4, a circuit establishing process shown in FIGS. 12A to 12D and 13, and other processes in accordance with programs stored in ROM 52.

The file unit 10 of the storage unit 9 has a toll table file 32, a subscriber service grade file 36, a traffic information file 34, a main file 38, a sub-file 40, a subscriber transfer destination file 42, and etc.

The file unit 10 may be provided within each node 2.

The circuit switching units 24, 28, switch unit 26, and file unit 10 are all connected to and controlled by the control unit 22.

Next, taking as an example a speech communication, there will be described the operations at a service subscriber (user) and the service vendor in a communication service system which provides a communication service to a subscriber by using a public switched network system.

Figure 3A:
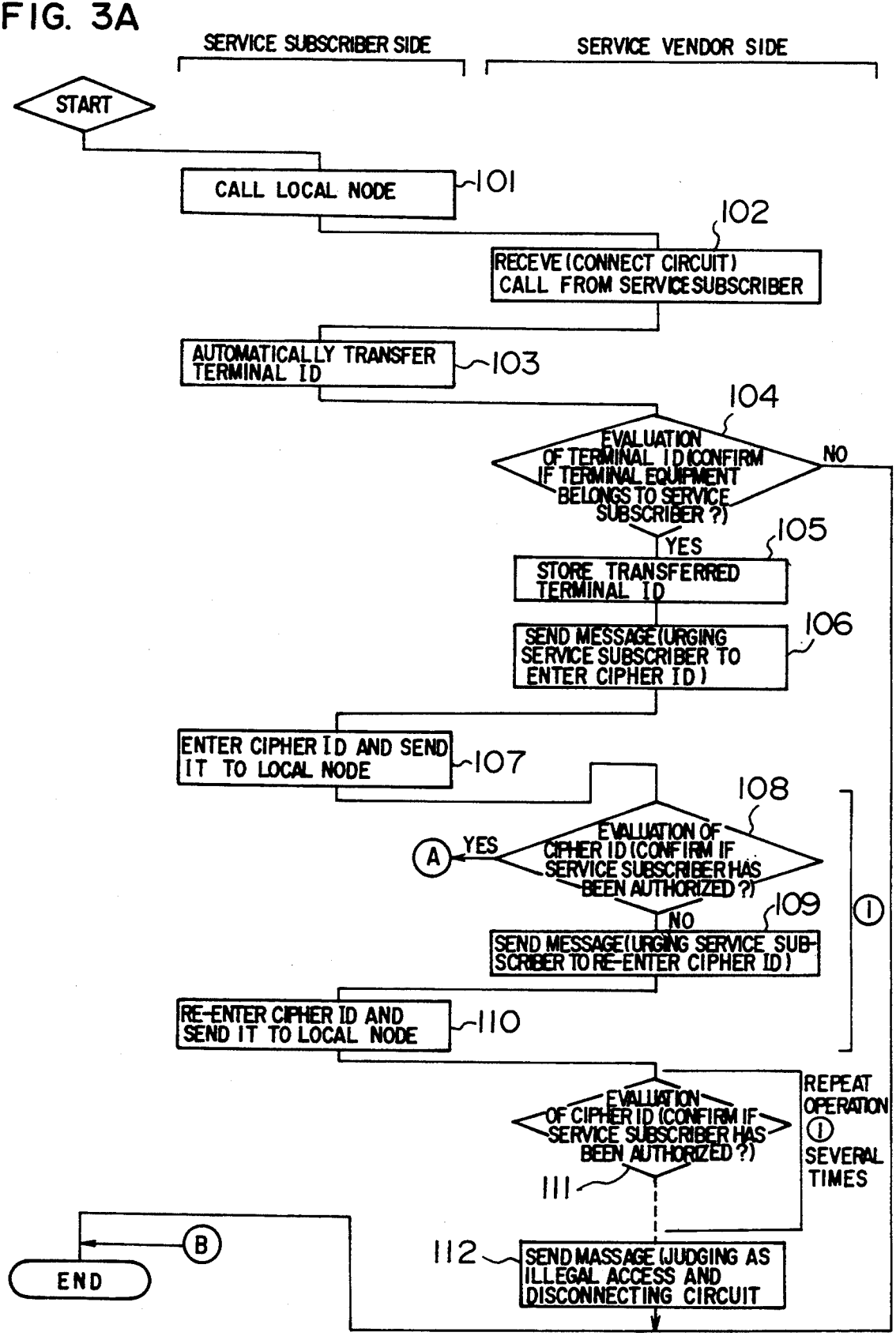
Figure 3B:
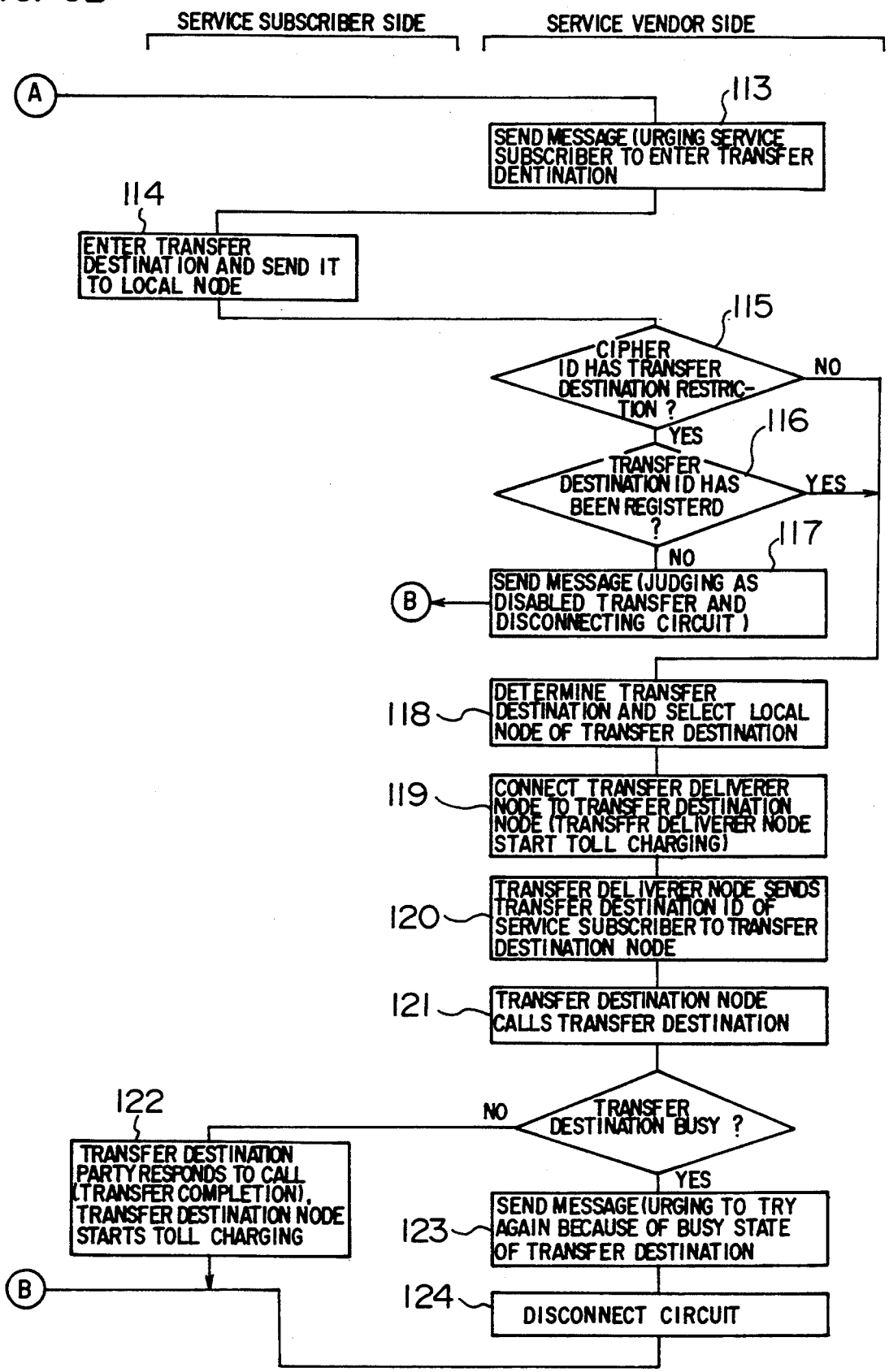

FIGS. 3A and 3B are flow charts showing an example of a communication start operation between a service subscriber and a service vendor. Assuming that a service subscriber at an A district calls a partner at a B district using this service, the service subscriber at the A district first calls a local node A over a telephone set 6 with the cipher ID generation function or over an ordinary telephone set 7 (step 101). The control unit 22 at the node A receives the call from the service subscriber, i.e., the control unit 22 establishes a circuit between the subscriber and the circuit switching unit 24 (step 102). After this call reception, the terminal equipment for the service subscriber (the telephone set 6 with the cipher ID generation function, or the cipher ID generator 8 as an external equipment of the telephone set 7) automatically delivers the terminal ID specific to the terminal equipment to the node A via the public switched network system 11 (step 103). The control unit 22 at the local node A evaluates this ID to confirm if it belongs to the service subscriber in concern (step 104). Thereafter, the received terminal ID is stored in a memory such as RAM 54 (step 105). The terminal ID is formed for example by a combination of several Dual Tone Modulation Frequency signals, each terminal device used by the subscribers being assigned a specific ID. Each of the terminal devices generates the terminal ID automatically or in response to one-touch operation by the subscriber.

Particularly, at step 104 when the transferred terminal ID is sent from the public switched network 11 via the circuit switching unit 24, the control unit 22 at the node A 2 refers to (checks) the main file 38 to see if the terminal ID has already been registered in the main file 38 or not. If registered, it is judged that the terminal equipment designated by the terminal ID belongs to the service subscriber in concern. Thereafter, the control advances to step 105. The terminal ID of a terminal equipment is registered in the main file 38 of a local node (node A 2 in this case) at the time when a user subscribed to this service. As shown in FIG. 6A, the main file 38 is provided for each terminal equipment.

If the terminal ID of the terminal equipment of a service subscriber is not transferred, or if a false terminal ID is transferred, i.e., if the transferred terminal ID is not still registered in the main file, the control unit reads a predetermined message (e.g., a message stating that "your terminal equipment is not authorized to receive this service") stored in ROM 52, sends it to the subscriber terminal equipment via the circuit switching unit 24, and causes the circuit switching unit 24 to disconnect the circuit to the subscriber terminal equipment.

If it is confirmed that the transferred terminal ID belongs to the terminal equipment in concern, the control unit 22 at the node A 2 sends a message (e.g., a message stating that "this is private speech transfer service, enter your cipher ID") to the subscriber terminal equipment to urge the service subscriber to enter the cipher ID (step 106). The service subscriber then enters the cipher ID using the telephone set 6 having the cipher ID generation function or the cipher ID generator 8 as the external equipment (step 107). The cipher ID is for example a combination of several Dual Tone Modulate Frequency (DTMF) signals, each service subscriber being assigned a specific cipher ID. The telephone set 6 with the cipher ID generation function is constructed such that it can generate a terminal ID and a cipher ID through a one-touch operation. The cipher ID generator 8 as the external equipment is for example an oscillator called a tone dialer which is also constructed such that it can generate a terminal ID and a cipher ID through a one-touch operation. Therefore, if a tone dialer is used, it is possible to have a speech communication with another telephone set at the same node or at a different node, so long as the node at the transfer deliverer has registered the terminal ID and cipher ID. The node A 2 evaluates the transferred cipher ID to confirm whether or not the terminal equipment is authorized to receive the service (step 108). Specifically, the control unit 22 at the node A 2 refers to the main file 38 corresponding to the terminal ID stored in RAM 54 at step 105 to check if the transferred cipher ID has already been stored in it (i.e., if the user has been registered as the subscriber to the terminal equipment in concern). If registered, it is judged that the user is a subscriber to the service. As seen from FIG. 6A, it is possible to register a user of a terminal equipment as a subscriber to the service, by registering a cipher ID of the user in the main file 38 which stores a plurality of cipher IDs of subscribers to each terminal equipment.

If the cipher ID is false, i.e., if the cipher ID is not stored in the main file 38 corresponding to the terminal equipment now in concern, a message to such effects is sent back to the user intending to receive this service, to thereby urge the user to enter again a cipher ID (step 109). In this case, the service subscriber enters again a cipher ID by using the telephone set 6 having the cipher ID generation function or the cipher generator 8 as the external equipment (step 110). If a correct cipher ID is not entered after such operations are repeated several times, i.e., if all the entered cipher IDs have not been registered in the main file, the node A 2 judges that an unauthorized party is trying to have an access to this service, sends a message (e.g., a message stating that "you are not authorized to receive this service"), and causes the circuit switching unit 24 to disconnect the circuit to the subscriber terminal equipment (step 112).

If the evaluation of the cipher ID by the node A 2 confirms that the user is an authorized subscriber to this service, then the node A 2 sends a message (e.g., a message indicating that "enter a transfer destination ID") to the service subscriber urging to enter a transfer destination. In response to this message, the service subscriber enters a transfer destination ID by using the telephone set 6 having the cipher ID generation function or the external equipment 8 (step 114). Also in this case, the transfer destination ID is transmitted using for example DTMF signals. Next, it is checked if the cipher ID has any transfer destination restriction (step 115). This transfer destination restriction is checked in the following manner.

As shown in FIG. 6A, in the main file 38, the cipher IDs of service subscribers using a terminal equipment are registered using as a key parameter each terminal ID. Transfer destination restriction data is added to each cipher ID, for example, at the last bit thereof, this data indicating whether or not there is any transfer destination restriction for the cipher ID. It is assumed that the data "1" indicates a transfer destination restriction and the data "0" indicates no restriction. A transfer destination file as shown in FIG. 6C is provided for each cipher ID having a transfer destination restriction, a transfer destination ID being stored in this file. If a cipher ID has any transfer destination restriction, transfer is not allowed to destinations other than those registered in the file 42 for the cipher ID in concern. Registration of a transfer destination ID in this transfer destination file 42 is made when a service subscriber asks the service vendor to receive the transfer destination restriction service.

The service vendor determines a basic charge in accordance with the number of registered transfer destinations, allowing speech communications with only the registered transfer destinations. Another charge is also determined for the case there is no transfer destination restriction, allowing speech communications with all transfer destinations.

Upon reception of a transfer destination ID, the control unit 22 at the node A checks, by using the terminal ID and cipher ID of the service subscriber, the transfer destination restriction data for the cipher ID in the main file 38 of the file unit 10, to thereby determine if the service subscriber has made a transfer destination restriction or not (step 115). If not, a local node to the transfer destination (in this example, node B 4) is selected. If there is a transfer destination restriction, it is checked whether or not the transfer destination designated by the service subscriber has been registered in the transfer destination file 42 for the cipher ID in concern (step 116). If not registered, a message of disabled speech (e.g., a message indicating that "speech is not allowed with a partner you want") is sent to the service subscriber, and the circuit is disconnected (step 117). If the transfer destination ID has been registered, the node A 2 selects a local node to the transfer destination (nodes B 4) (step 118). If speech communications are allowed, the subscriber terminal equipment is connected to the node B 4 via the public switched network 1 (step 119). Specifically, the control unit 22 connects the circuit switching unit 28 to the circuit of the node B 4 so that the subscriber terminal equipment and the node B 4 are interconnected via the circuit switching units 24 and 28, and switch unit 26 respectively of the node A 2. Next, the node A 2 transmits the transfer destination ID of the service subscriber to the node B 4 (step 120). After receiving the transfer destination ID, the node B 4 calls the transfer destination (step 121). If the transfer destination responds to this call, the transfer establishment is completed so that speech communications are realized between the service subscriber and the transfer destination partner (step 122). If the transfer destination is busy, the node B 4 sends a message (e.g., a message indicating that "transfer destination is busy, call again after a while") to the node A and to the service subscriber (step 123). The nodes A 2 and B 4 disconnect all circuits between the subscriber terminal equipment and the transfer destination (step 124).

Figure 4:
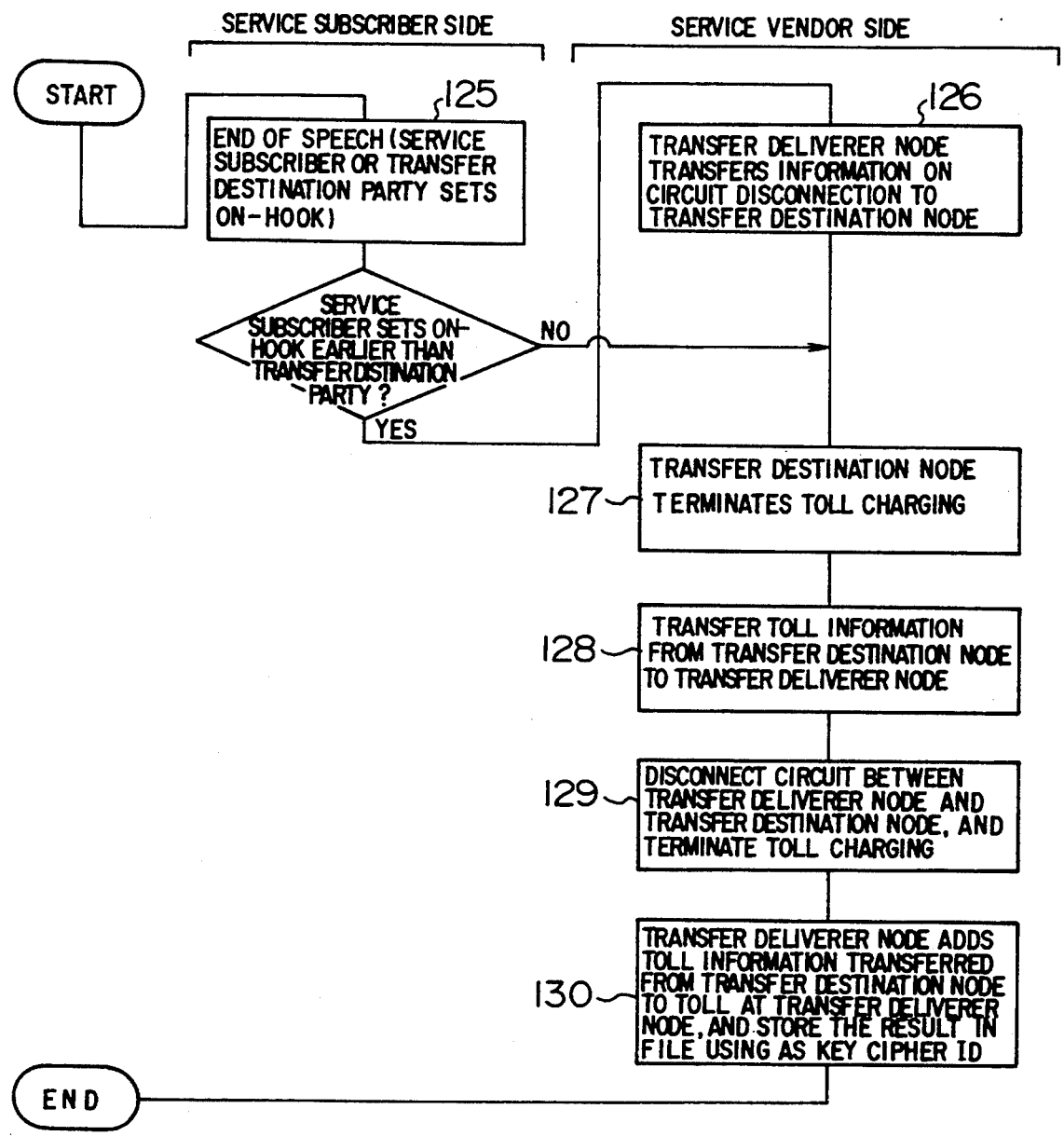
FIG. 4 is a flow chart showing an example of an inter node transfer completion process according to an embodiment of this invention.
Figure 12A:
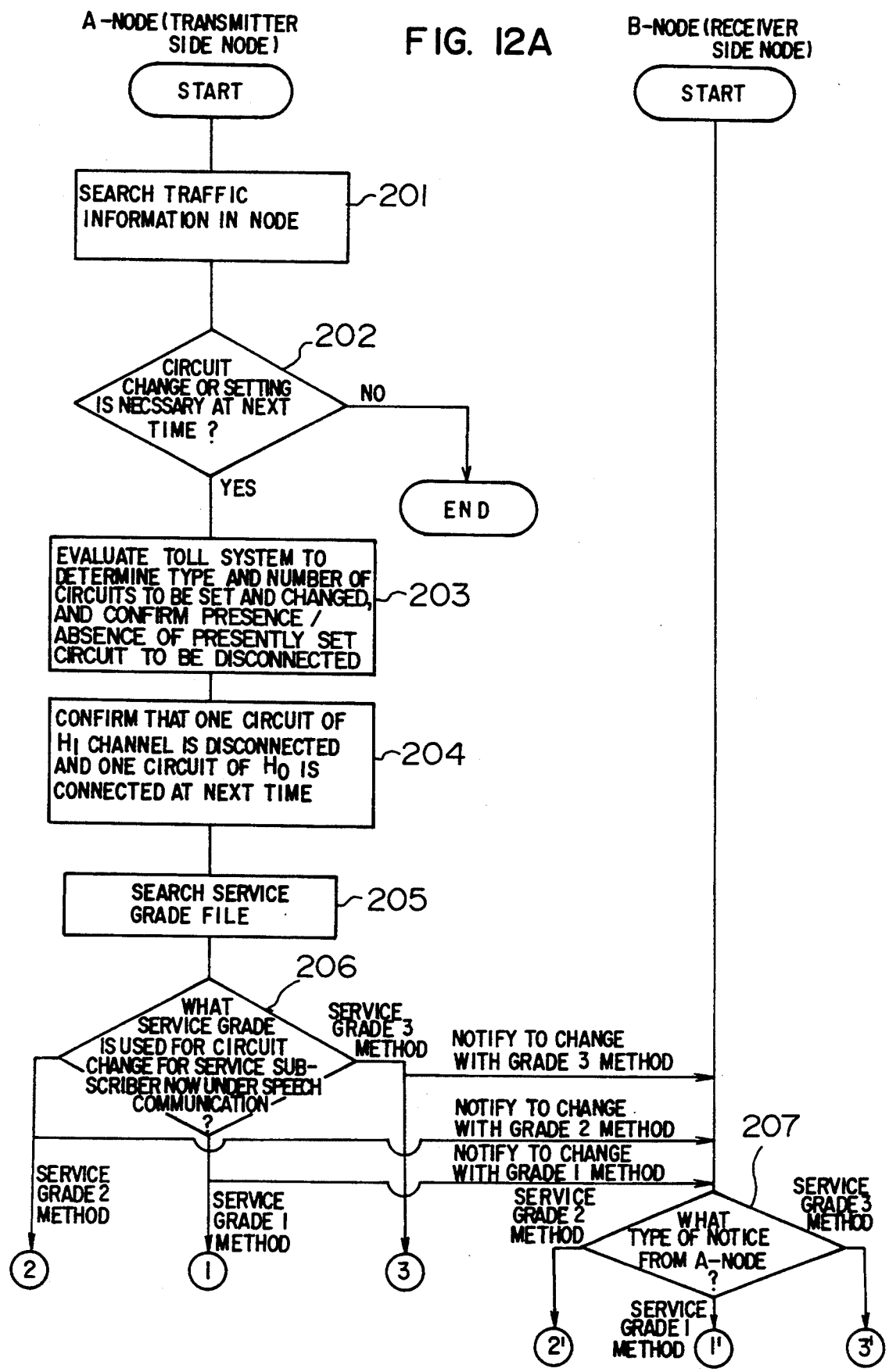
Figure 12B:
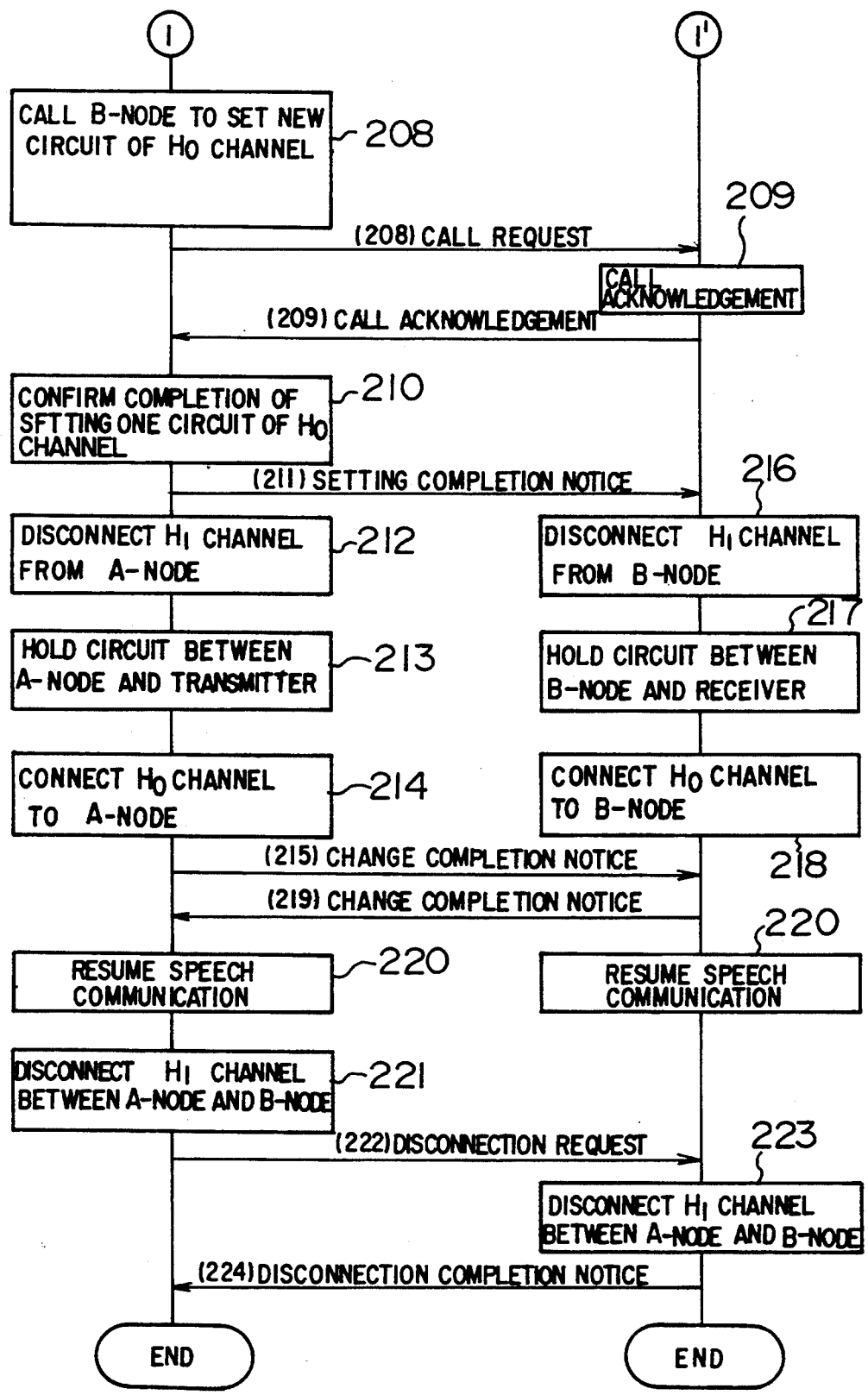
Figure 12C:
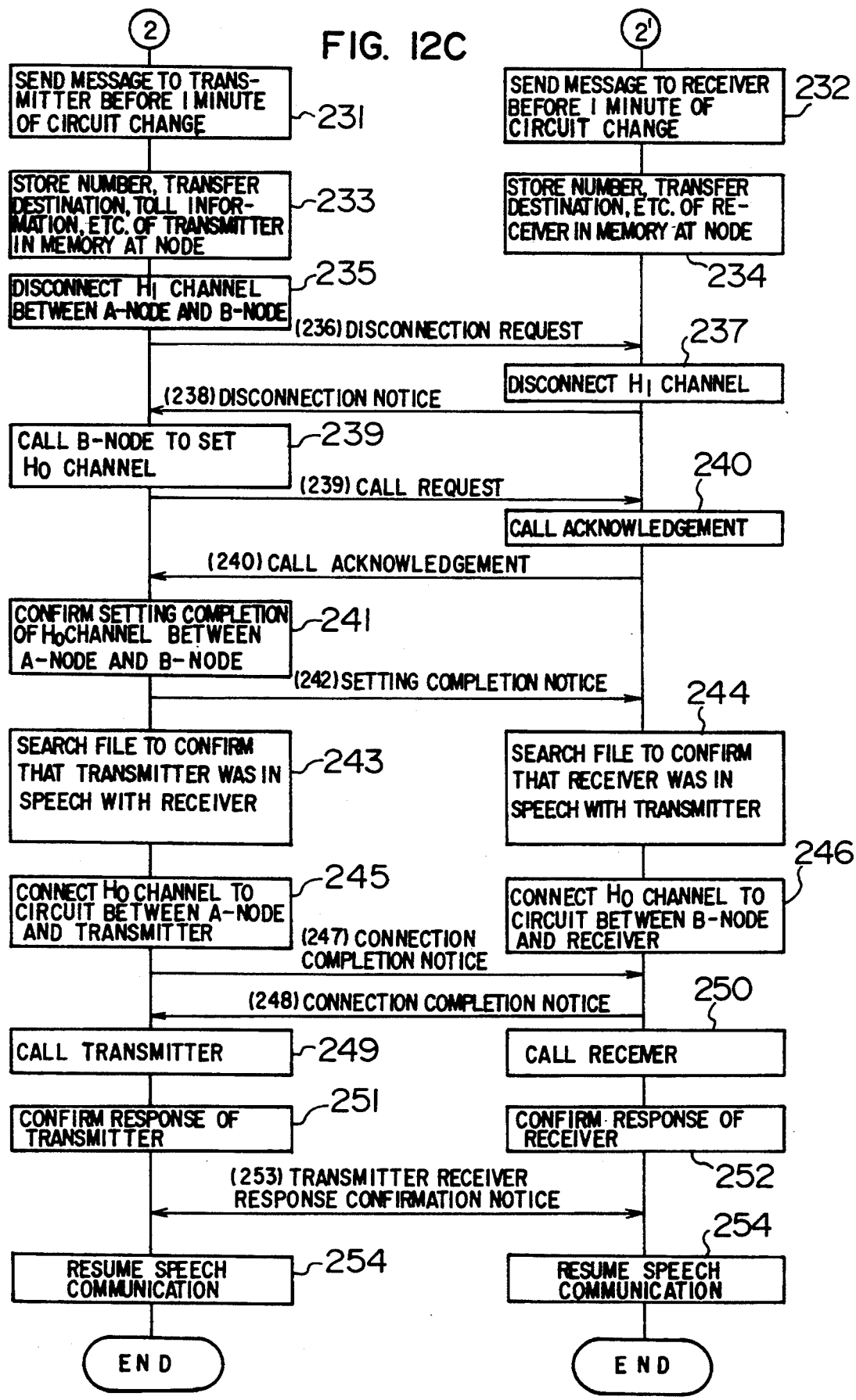

FIG. 4 is a flow chart illustrating the operation when speech communications are terminated between a service subscriber and a transfer destination. First, speech communications are terminated (on-hook) either by the service subscriber or the transfer destination (step 125). Assuming that the circuit between the node A 2 and the service subscriber is disconnected at first, the control unit 22 of the node A 2 detects this disconnection, and the node A 2 transfers the information on this disconnection to the node B 4 (step 126). Upon reception of this information, the node B 4 terminates a toll charging operation for the circuit between the node B 4 and the transfer destination to obtain a resultant toll for a speech therebetween (step 127). Next, the node B 4 transfers the information representative of the resultant toll to the node A 2 (step 128). The circuit switching unit 28 of the node A 2 disconnects the circuit to the node B 4, and the node A terminates a toll charging operation for the circuit between the node A 2 and the node B 4 to obtain a resultant toll for a speech therebetween (step 129). Lastly, the control unit 22 of the node A 2 adds together the resultant toll information transferred from the node B 4 and the resultant toll obtained at the node A 2, to thereby store the total toll in the file 10 of the storage unit 9 using as a key parameter the cipher ID of the service subscriber, namely, to store the total toll in the sub-file 40 for the cipher ID at a toll information area of the transfer destination (step 130).

FIGS. 5A to 5C show examples of the formats of signals to be sent by a service subscriber at the transmitter side. Signals to be sent by a service subscriber at the transmitter side include a terminal ID, a cipher ID, and a transfer destination ID. The terminal ID is composed of, for example, eight characters representative of a district name and eight numbers, resulting in total sixteen digits. This terminal ID is supplied from the service vendor when a service contract is entered, for each terminal device such as a telephone set 6 having the cipher ID generation function or a cipher ID generator 8 as the external equipment. The terminal ID is delivered automatically or by a one-touch operation to the local node from the terminal device when a call is received at the node. The cipher ID is composed of, for example, eight numbers which are assigned to a service subscriber. It is possible for the same subscriber to have a plurality of cipher IDs each assigned to one or more of particular transfer destinations. A cipher ID entered by a service subscriber from a terminal equipment such as a tone dialer, is transferred to a local node as a combination of DTMF signals. The transfer destination ID is composed of, for example, seven digits, and delivered to a local node as a combination of DTMF signals.

FIGS. 6A to 6C show examples of the format of the file unit 10 for service subscribers, the file unit 10 in the storage unit 9 being provided for each node 2 to 5 of the service vendor. As described previously, the file unit 10 for service subscribers includes main files 38 arranged for example in the ascending order of a terminal ID number, sub-files 40 arranged for example in the ascending order of a cipher ID number, and transfer destination files 42. Although only ones of each of the files 38 to 42 are shown in FIGS. 6A to 6C, the files 38 to 42 each has a plurality of files for respective terminal IDs and cipher IDs. A service subscriber is permitted to receive the service only when the cipher ID entered by the service subscriber is found within the main file at the local node when it is searched using as a key parameter the automatically transferred terminal ID. As described previously, transfer destination restriction data of one bit is added to each cipher ID as the last bit thereof for the discrimination between restricting or not restricting a transfer destination. For example, "1" is entered in this bit if a transfer destination is restricted, and "0" is entered if not restricted. If the transfer restriction bit is "1" each node searches a transfer destination file using the cipher ID as a search key, and checks if the transfer destination the service subscriber designates has been registered in the sub-file. If registered, a local node to this transfer destination is selected. It not on the other hand, a message to the effect that a transfer is not allowed is notified to the service subscriber. If the transfer destination restriction bit is "0", a local node to the transfer destination itself is selected. The transfer destination ID in both the cases is stored in the sub-file. After circuit disconnection, using the cipher ID as a key parameter, each node stores toll information in the sub-file at a toll information space after the transfer destination ID.

Next, an example of the operation between service vendor nodes will be described.

Each node stores traffic information in the traffic information file 34, the traffic information being provided for each district, i.e., the traffic information on each of other nodes relative to the node in concern being provided with respect to month, day, and hour. An example of such information is that 115 communications each having an average circuit holding time of 180 seconds occurred during the time period from 12:00 to 13:00 on October 10 between the districts A and B. Each node also stores communication tolls in the toll table file 32, the communication tolls being prepared per unit time for respective circuits between the node in concern and other nodes. Upon the first request by a service subscriber for receiving the service for a circuit between the districts A and B during a time period (e.g., during a time period from 12:00 to 13:00 on October 10), the service vendor establishes a connection between the associated nodes 2 and 4 by providing a circuit having a capacity margin to some degree, in accordance with the evaluation of the traffic information and the toll system of the public switched network between the nodes 2 and 4. For example, if the evaluation results by the nodes indicate that a certain circuit provided by the service vendor circuit, e.g., an $H_1$ channel (capacity 384 kbps) of an ISDN primary service provided by NTT (Nipon Telephone and Telegram Co., Ltd.), is optimum during such the time period from the viewpoint of circuit capacity and circuit toll, then the service vendor uses this circuit to interconnect the nodes. Further, if the traffic becomes in excess of the circuit capacity after the circuit $H_0$ has been established, there is additionally set a desired number of circuits of a B channel (capacity 64 kbps) of the ISDN basic service (2B to D) between the nodes. By providing the above functions to each node, an efficient interconnection between nodes can be realized.

A more efficient interconnection between nodes can be realized if each node is provided with a function to compress and multiplex voice signals transferred between nodes.

Particular examples for this will be described below.

It is assumed that circuits of an $H_0$ channel (capacity 384 kbps), an $H_1$ channel (capacity 1.5 Mbps), and a B channel (capacity 64 kbps), respectively of the ISDN basic interface (INS net 64) and primary rate interface (INS net 1500) provided by NTT are used for the interconnection between nodes. A voice compression function is used to compress a voice sound to be transferred between nodes to 32 kbps, to thereby efficiently use circuits. For example, a circuit having a capacity of 1.5 Mbps can be used for 48 voice communications. A circuit having a capacity of 384 kbps can be used for 12 voice communications, and a circuit having a capacity can be used for 2 voice communications.

It is assumed now that the traffic information regarding a circuit between a node A 2 (Tokyo) and a node B 4 (Osaka) is as shown in FIG. 7. FIG. 7 shows the traffic state of circuits between Tokyo and Osaka on a certain day, the traffic state having been estimated from past data and stored in the file 34. The abscissa represents time and the ordinate represents the number of speech communications. The number of speech communications represents the estimated number of transfer processes to be executed at a node at a certain time. The distance between Tokyo and Osaka is 408 km and the communication holding time is assumed 3 minutes per one speech. The service vendor makes a contract, in advance, with a common carrier with respect to the types and numbers of circuits to be used, in accordance with the estimated maximum traffic at time C.

For example, assuming that a speech communication starts at time A at first, a peak traffic (at time B) during a unit time (e.g., one hour is assumed as the unit time) is estimated and a circuit ($H_1$ channel) having a capacity of 1.5 Mbps is set for processing 48 speech communications. For the period where the number of speech communications exceeds 48, there is additionally set either a circuit (B channel) having a capacity of 64 kbps (corresponding to 2 speech communications) or a circuit ($H_0$ channel) having a capacity of 384 kbps (corresponding to 12 speech communications), in accordance with the number of increased speech communications. At time E the peak traffic during the unit time becomes smaller (capacity 1.5 Mbps) and a circuit of the $H_0$ channel (capacity 384 kbps), respectively of the INS net 1500 provided by the common carrier. For the remaining speech communications, there is additionally set a circuit of the $H_0$ channel (case (1) indicated at a circle 1 in FIG. 9) or a desired number of circuits of the B channel (capacity 54 kbps) (case (2) indicated at a circle 2 in FIG. 9). The number of circuits of the B channel (capacity 64 kbps) at each time is shown in FIG. 9 relative to the number of speech communications.

The communication tolls for the circuits of the $H_1$ channel (1.5 Mbps), $H_0$ channel (384 kbps), and B channel (64 kbps) between the node A 2 (Tokyo) and the node B 4 (Osaka) are set as 60 Yen per 4.5 sec, 30 Yen per 6 sec, and 10 Yen per 5.5 sec, respectively, according to the toll system of the INS net 674 and INS net 1500, as shown in FIG. 6E. The communication toll between the time period from 10:00 to 11:00 is calculated in the following manner.

| Case (1) | | |
|---|---|---|
| $H_1$ channel: | $3600/4.5 \times 60$ Yen $\times 1$ circuit = | 48000 Yen |
| $H_0$ channel: | $3600/6 \times 30$ Yen $\times 2$ circuits = | 36000 Yen |
| | Total | 84000 Yen |
| Case (2) | | |
| $H_1$ channel: | $3600/4.5 \times 60$ Yen $\times 1$ circuit = | 48000 Yen |
| $H_0$ channel: | $3600/6 \times 30$ Yen $\times 1$ circuit = | 18000 Yen |
| and for 65 circuits of the B channel (capacity 64 kbps) | | |
| B channel: | $3 \times 60/5.5 \times 10$ Yen $\times 65$ circuits = | 21450 Yen |
| | Total | 87450 Yen | than 12 and it may be expected that the peak traffic will reduce thereafter. Therefore, there is set only a circuit ($H_0$ channel) having a capacity of 384 kbps. Contrary to this expectation, if the peak traffic exceeds 12, there is set a circuit (B channel) having a capacity of 64 kbps or a circuit ($H_0$ channel) having a capacity of 384 kbps, in accordance with the number of increased speech communications. When the last speech is terminated at time F, all circuits are disconnected.

The control unit 22 of each node 2 to 5 having the structure as shown in FIG. 1 is provided with a function of evaluating a traffic in the manner described above, and of dynamically (every unit time) changing the settings of the types and numbers of circuits in accordance with a change of the traffic.

In the following, there will be described an example of the operation to be executed by each node for the evaluation of a traffic and for the determination of a corresponding toll.

FIG. 18 shows an enlarged unit time between two times B' and B" shown in FIG. 7. The maximum number of speech communications to be processed during a period from time $B_0$ to time $B_1$ is 60. The time period from 10:00 (B') to 11:00 (B") is divided into three-minute sub-periods at times $B_0$ to $B_{20}$ (assuming that the speech communication holding time is 3 minutes per one speech). Up to 60 speech communications during each sub-period, there are set a circuit of the $H_1$ channel of the $H_0$ channel is cheaper than the case (2). Therefore, in this example, the control unit 22 at the node A 2 operates such that the circuit switching unit 28 sets one circuit of the $H_1$ channel and two circuits of the $H_0$ between the node A 2 and the node B 4.

FIG. 10 shows an enlarged unit time between two time points C' and C" (15:00 to 16:00) shown in FIG. 7. In FIG. 9, the maximum number of speech communications per unit time to be processed during the time period from $C_0$ to $C_{20}$ is 69.

Similar to the example shown in FIG. 8, there are set circuits for covering the number of speech communications at each time. In the case (1) indicated at a circle 1 in FIG. 11, there are set two circuits of the $H_0$ channel (capacity 384 kbps) and one circuit of the $H_0$ channel (capacity 1.5 Mbps). In the case (2) indicated at a circle 2 in FIG. 11, there are set one circuit of the $H_0$ channel and one circuit of the $H_1$ and a desired number of circuits of the B channel (capacity 64 kbps). In the case (3) indicated at a circle 3 in FIG. 11, there are set one circuit of the $H_1$ channel and a desired number of circuits of the B channel.

FIG. 11 shows the number of set circuits of the B channel (capacity 64 kbps) relative to the number of speech communications at each time. The communication toll between the time period from 15:00 to 16:00 is calculated in the following manner.

| Case (1) | | |
|---|---|---|
| $H_1$ channel: | $3600/4.5 \times 60$ Yen $\times 1$ circuit = | 48000 Yen |
| $H_0$ channel: | $3600/6 \times 30$ Yen $\times 2$ circuits = | 36000 Yen |
| | Total | 84000 Yen |
| Case (2) | | |
| $H_1$ channel: | $3600/4.5 \times 60$ Yen $\times 1$ circuit = | 48000 Yen |
| $H_0$ channel: | $3600/6 \times 30$ Yen $\times 1$ circuit = | 18000 Yen |
| and for 17 circuits of the B channel | | |
| B channel: | $3 \times 60/5.5 \times 10$ Yen $\times 17$ circuits = | 5610 Yen |

-continued

| | | Total 71610 Yen |
|---|---|---|
| Case (3) | | |
| H₁ channel: and for 53 circuits of the B channel | 3600/4.5 × 60 Yen × 1 circuit = | 48000 Yen |
| B channel: | 3 × 60/5.5 × 10 Yen × 53 circuits = | 17490 Yen |
| | | Total 65490 Yen |

As described above, the case (3) where there are set one circuit of the Hi channel and a desired number of circuits of the B channel is cheaper than the other cases (1) and (2). Therefore, in this example, the node operates to set one circuit of the $H_1$ channel and a desired number of circuits of the B channel.

Next, the connection and disconnection of a circuit will be described. As described with FIG. 7, each node estimates the amount of speech communications at each unit time to select suitable circuits. If a presently connected circuit is to be disconnected and a new circuit is to be connected and if a new call is generated in such a case, the local node sends a message to the subscriber intending to receive the speech transfer service, in the similar manner while an ordinary telephone call is performed.

On the other hand, a partner during speech communication in such a case is provided with one of circuit change services having the following three types of service grades.

Service Grade 1: Both a circuit to be disconnected and a circuit to be newly set are set temporarily during the time period of circuit change. Circuits are changed at once so that both communication partners do not sense circuit connection and disconnection.

Service Grade 2: At a time before the disconnection by a predetermined time, e.g., one minute, a message is sent to both communication partners to the effect that the circuit will be temporarily disconnected. During a circuit change operation, the telephone numbers of both the partners, toll information, and the like are stored in a memory, e.g., RAM 54 of each node. At the same time when the circuit is connected again, each node checks the RAM and calls the associated partner to allow speech communications.

Speech communications between the service subscriber and the transfer destination partner become impossible for a period from circuit disconnection to circuit connection.

Service Grade 3: At a time before the disconnection by a predetermined time, e.g., three minutes, a message is sent to both communication partners to the effect that the circuit will be disconnected. After the circuit is disconnected, speech communications are forcibly stopped.

The service vendor makes a contract with a service subscriber as to the type of service grade the subscriber intends to use. In this case, the toll is set different depending upon a selected service grade. The contract contents of each service subscriber are stored in the service grade file 36 (FIG. 6D) of the local node at the next area to the subscriber cipher ID area.

There will be described in the following examples of the circuit disconnection and connection operations executed at each unit time by each node in accordance with the three types of service grades, with reference to the flow charts shown in FIGS. 12A to 12D. There will be later described with reference to FIG. 13 an example of the operation by a node for the case where all circuits presently set are all busy and the traffic increases in this condition, namely for the case where an actual traffic becomes in excess of the estimated traffic.

The operations by a node A 2 and a node B 4 will be described, assuming that the node A 2 is a local node of a transmitter, the node B4 is a local node of a receiver, and for the estimated traffic therebetween at the next circuit change time, one circuit of the $H_1$ channel is disconnected and one circuit of the $H_0$ channel is connected. The operations are executed at each unit time, e.g., every hour.

The control unit 22 of the node A 2 searches its traffic information file 34 and checks the traffic information between the nodes 2 and 4 at the next circuit change time (after the lapse of the unit time) (step 201) to judge if it is necessary to set a new circuit or exchange a circuit (step 202). If not necessary, the node A 2 stops searching the file 34 (step 300). If it is judged that a new circuit is to be set or a circuit is to be exchanged, the control unit 22 at the node A 2 refers to the toll table file 32, and in accordance with the toll system of the communication circuits and the searched traffic information, determines the types and numbers of circuits to be connected, and confirms if there is any presently set circuit to be disconnected (step 203). There is obtained therefore an evaluation that it is most suitable to disconnect one circuit of the $H_1$ channel and newly connect one circuit of the $H_0$ channel at the next circuit change time (step 204). The traffic information file 34 stores as shown in FIG. 6F the traffic information per unit time between the node in concern and other nodes. The toll table file 32 stores as shown in FIG. 6E speech communication tolls per unit time for each channel between the node in concern and other nodes. This speech communication toll may be set different depending upon the unit time, e.g., one our.

Next, the node A 2 searches the service grade file 36 (step 205) to check which service grade among the above-described service grades 1 to 3 is used for the circuit change of the service subscriber under speech communications (step 206). The node A 2 informs the node B 4 of which service grade is used for the service subscriber, and the node B 4 confirms this information (step 207).

If the node A 2 judges that the service grade 1 is used for the service subscriber, it calls the node B 4 for the establishment of a circuit of the $H_0$ channel to be newly connected (step 208). The node B 4 which received the call reception request immediately acknowledges the call reception, and returns the acknowledgment to the node A 2 (step 209) to complete the establishment of the circuit of the $H_0$ channel (step 210). At the same time, the node A 2 sends the establishment completion notice back to the node B 4 (step 211). The circuit switching unit 28 of the node A 2 disconnects the circuit of the $H_1$ channel (step 212). At this time, the circuit between the node A 2 and the transmitter is maintained in a hold state (step 213). Immediately after disconnecting the circuit of the $H_1$ channel, the circuit switching unit 28 of the node A 2 connects the circuit of the H0 channel (step 214) and sends a circuit change completion notice to the node B 4 (step 215). Similarly, the circuit switching unit 28 of the node B 4 disconnects the circuit of the H$_1$ channel (step 216) and immediately connects the circuit of the H0 channel (step 217). At this time, the circuit between the node B 4 and the receiver is maintained in a hold state (step 218). After the circuit change, the node B4 sends a circuit change completion notice to the node A 2 (step 219). In this condition, a speech communication resumes using the circuit of the H$_0$ channel via the node A 2 and the node B 4 (step 220). Thereafter, the node A 2 disconnects the circuit of the H$_1$ channel (step 221), and sends a circuit disconnection request to the node B 4 (step 222). In response to this, the node B 4 disconnects the circuit of the H$_1$ channel (step 223), and sends a disconnection completion notice to the node A 2 (step 224). In the above manner, the circuit change operations by the nodes 2 and 4 are completed using the service grade 1.

If the node A 2 judges at step 206 that the circuit change is carried out using the service grade 2, the node A 2 sends a message to the transmitter before one minute of the circuit change, to the effect that the circuit will be disconnected (e.g., a message stating that "speech communications will be intercepted after one minute, so wait while hooking the handset. You will be called later from us") (step 231). Next, the telephone number of the transmitter, transfer destination, toll information, and the like are stored (step 233). The node B 4 sends a similar message to the receiver (step 232), and stores the telephone number of the receiver and the transfer destination in a memory of the node, e.g., RAM 54 (step 234). Next, the node A 2 disconnects the circuit of the H$_1$ channel (step 235), and sends a disconnection request to the node B 4 (step 236). Upon reception of this disconnection request, the node B 4 disconnects the circuit of the H$_1$ channel (step 37), and sends a disconnection notice to the node A 2 (step 238). The node A 2 calls the node B 4 for the establishment of a circuit of the H$_0$ channel (step 239). The node B 4 which received the call reception request immediately acknowledges the call reception, and returns the acknowledgment to the node A 2 (step 240). The node A 2 which received this acknowledgment judges that the circuit of the H$_0$ channel has been established between the node A 2 and the node B 4 (step 241), and sends an establishment completion notice to the node B 4 (step 242). Thereafter, the node A 2 and the node B 4 search their RAMS 54 to confirm the partners of the transmitter and receiver (steps 243 and 244). The node A 2 connects the circuit of the H0 to the receiver (step 245), whereas the node B 4 connects the circuit of the H$_0$ to the receiver (step 246) and sends a circuit connection completion notice to the node A 2 (step 248). Thereafter, the node A 2 calls the transmitter, and the node B 4 calls the receiver (steps 249 and 250). After confirming the responses from both the parties, the node A 2 sends a transmitter response confirmation notice to the node B 4, whereas the node B 4 sends a receiver response confirmation notice to the node A 2 (step 253). In this condition, a speech communication resumes (step 254).

If the node A 2 judges at step 206 that the circuit change is carried out using the service grade 3, the node A 2 and the node B 4 send a message to the transmitter and receiver, respectively, before three minutes of the circuit change, to the effect that the circuit will be disconnected (e.g., by means of buzzer sounds) (steps 261 and 262). Next, the circuit switching unit 28 of the node A 2 disconnects the circuit of the H$_1$ channel between the node A 2 and the node B 4 (step 263), and sends a disconnection request to the node B 4 (step 264). The circuit switching unit 28 of the node B 4 then disconnects the circuit of the H$_1$ channel (step 265), and sends a disconnection notice back to the node A 2 (step 266). With this disconnection notice, the node A 2 judges that the circuit of the Hi between the node A 2 and the node B 4 has been disconnected (step 267). Next, the node A 2 disconnects the circuit between the node A 2 and the transmitter (step 269). Similarly, the node B 4 disconnects the circuit between the node B 4 and the receiver (step 270), and sends a disconnection notice back to the node A 2 (step 272). At this time, a speech communication is intercepted between the transmitter and the receiver (step 272). Thereafter, if a first call occurs from a service subscriber, the node A 2 calls the node B 4 for the establishment of a new circuit of the H$_0$ channel (step 273). With this call reception request, the node B 4 acknowledges this call reception and sends back a call reception acknowledgment notice to the node A 2 (step 274). With this notice, the node A 2 judges that the circuit of the H$_0$ channel between the nodes A 2 and the node B 4 has been established (step 275), and sends an establishment completion notice to the node B 4 (step 276). The node B 4 evaluates the transfer destination ID and calls the transfer destination (step 277). After confirming a response from the transfer destination (step 278), the node B 4 sends a transfer destination response notice to the node A 2 to thereafter allow a speech communication therebetween (step 280). In the above manner, the circuit change operations by the nodes 2 and 4 are completed using the service grade 3.

Next, there will be described with reference to the flow chart shown in FIG. 13 the operations at nodes for the case where the actual traffic becomes in excess of the estimated traffic. The operations illustrated in FIG. 13 are executed by nodes if all circuits presently held are all busy and the traffic increases in this condition. In the operations, it is assumed that the node A 2 is a local node for the transmitter, the node B 4 is a local node for the receiver, and the node A 2 judges that it is most suitable to connect a new circuit of the B channel.

The node A 2 first confirms an occurrence of a call from a service subscriber at the district A (step 301). The node A 2 checks if there is any idle circuit among presently held circuits between the node A 2 and the node B 4 (step 302). If there is an idle circuit, it is used and the operation by the node A terminates (step 400). If there is no idle circuit, the node A 2 selects the types and numbers of suitable circuits before the next circuit change time, while taking into consideration the estimated increase or decrease of the future traffic (step 303). For example, if the node A 2 judges that it is proper to connect a new circuit of the B channel, a notice to such effect is given to the node B 4 (step 304). The node B acknowledges this notice, and sends an acknowledgment back to the node A 2 (step 305).

Next, the node A 2 calls the node B 4 for the establishment of a circuit of the B channel (step 306). The node B 4 acknowledges this call request and sends an acknowledgment to the node A 2 (step 307). With this acknowledgment, the node A 2 judges that the circuit of the B channel has been established (step 308), and sends an establishment completion notice to the node B (step 309). The node B 4 then evaluates the transfer destination ID to call the transfer destination (step 310). After confirming a response from the transfer destination, the node B 4 sends a transfer destination response notice to the node A 2 (step 312) to allow a speech communication (step 313). The node A stores in its memory, e.g., RAM 54 the information representative of that a new circuit of the B channel has been connected (step 314), to thereafter terminate the operation.

In the above embodiment, speech transfer between nodes has been described. Instead of speech transfer, data transfer between nodes may be made by connecting data terminal equipments to nodes in place of telephone sets.

Furthermore, each telephone set (or terminal equipment) may be directly connected to the local node without connecting it to the public switched network 11.

Still further, service grades for a circuit change operation described with FIGS. 12A to 12D may be registered in the file 36 using as a key parameter the terminal ID instead of the cipher ID.

As apparent from the foregoing description of the present invention, in a network system having a plurality of nodes connected to a public switched network and providing a communication transfer service to a subscriber to the system, it is possible to prevent illegal or erroneous access to the system by other than subscribers, and to charge a toll correctly in accordance with a communication amount of a subscriber.

Furthermore, each node has a function of evaluating the traffic estimated from past data from the viewpoint of the circuit toll system and of dynamically setting a new circuit or exchanging a circuit, thereby realizing an efficient use of circuits. Still further, if the actual traffic becomes in excess of the estimated traffic, a desired number of new circuits can be set to readily deal with an increase or decrease of the traffic in excess of the estimated traffic.

The invention may be embodied in other specific forms without departing from the spirit of or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A method of controlling a data transfer by transfer deliverer node from a terminal equipment belonging to the transfer deliverer node to another node, in a network system having a plurality of nodes connected to a public switched network and a plurality of terminal equipment each connectable to one of said nodes, comprising the steps performed by each of said nodes of;

registering a discriminator specific to each terminal equipment belonging to said transfer deliver node in a first memory;

registering a discriminator specific to a user of each terminal equipment in a second memory for each terminal equipment belonging to said transfer deliverer node;

in response to a data communication request from said terminal equipment belonging to said transfer deliverer node, receiving said discriminator of said terminal equipment and said discriminator of user of said terminal equipment, respectively sent from said terminal equipment;

judging whether said received discriminator of said terminal equipment is registered in said first memory;

judging whether said received discriminator of said user of said terminal equipment is registered in said second memory as a discriminator of the user of said terminal equipment;

in response to judgement results, determining whether a data transfer from said terminal equipment is permitted or not; and registering a discriminator of a data transfer destination from said terminal equipment in a third memory for each said discriminator of said user, wherein said determining step includes a step of:

if said judging steps judge that said discriminator of said terminal equipment and said discriminator of said user of said terminal equipment are registered, in response to said judgements, judging whether said discriminator of the data transfer destination said from said terminal equipment is registered in said third memory as a transfer destination for said discriminator of the user, and if said judging steps judge that said transfer destination discriminator is registered, permitting transfer of the data from said terminal equipment to said transfer destination.

2. A method of controlling a data transfer by a transfer deliverer node from a terminal equipment belonging to the transfer deliverer node to another node, in a network system having a plurality of nodes connected to a public switched network and a plurality of terminal equipments each connectable to one of said nodes, comprising the steps performed by each of said nodes of:

registering a discriminator specific to each terminal equipment belonging to said transfer deliverer node in a first memory;

registering a discriminator specific to a user of each terminal equipment in a second memory for each terminal equipment belonging to said transfer deliverer node;

in response to a data communication request from said terminal equipment belonging to said transfer deliverer node, receiving said discriminator of said terminal equipment and said discriminator of a user of said terminal equipment, respectively sent from said terminal equipment;

judging whether said received discriminator of said terminal equipment is registered in said first memory;

judging whether said received discriminator of a user of said terminal equipment is registered in said second memory as a discriminator of the user of said terminal equipment;

in response to judgment results, determining whether a data transfer from said terminal equipment is permitted or not;

registering information of whether said terminal equipment at a data transfer destination is to be restricted or not in a third memory for each said discriminator of said user; and registering discriminator of said terminal equipment at a data transfer destination in a fourth memory for each said discriminator of said user registered as requesting a transfer destination restriction, wherein said determining step includes a step of:

if said judging steps judge that said discriminator of said terminal equipment and said discriminator of said user of said terminal equipment are registered, in response to said judgments, judging whether the transfer destination restriction is to be made by searching said information registered in said third memory corresponding to said user discriminator, if it is judged that the transfer destination restriction is made, judging whether said transfer destination discriminator sent from said terminal equipment is registered in said fourth memory, and, if it is judged that said transfer destination discriminator is registered, permitting transfer of the data from said terminal equipment to said transfer destination.

3. A method according to claim 4, wherein said determining step further comprising a step of:

if it is judged from the search result of said third memory that the transfer destination restriction is not made for said user discriminator, permitting transfer of the data from said terminal equipment to a transfer destination identified by said transfer destination discriminator.

4. A network system having a plurality of nodes connected to a public switched network and a plurality of terminal equipments each connectable to one of said nodes, each of said nodes comprising:

a first memory for registering a discriminator specific to each terminal equipment belonging to a node of a transfer deliverer;

a second memory for registering a discriminator specific to a user of each terminal equipment for each terminal equipment belonging to said transfer deliverer node;

means for receiving, in response to a data communication request from said terminal equipment belonging to said transfer deliverer node, said discriminator of said terminal equipment and said discriminator of a user of said terminal equipment, respectively sent from said terminal equipment;

means for judging whether said received discriminator of said terminal equipment is registered in said first memory:

means for judging whether said received discriminator of said user of said terminal equipment is registered in said second memory as a discriminator of said user of said terminal equipment;

means for determining, in response to judgement results, whether a data transfer from said terminal equipment is permitted or not; and a third memory for registering a discriminator of a data transfer destination from said terminal equipment for each said discriminator of said user, wherein said determining means includes:

means for judging, if both of said judging means judge that said discriminator of said terminal equipment and said discriminator of the user of said terminal equipment are registered, in response to said judgements, whether said discriminator of the data transfer destination sent from said terminal equipment is registered in said third memory as a transfer destination for said discriminator of the user, and means for permitting, if it is judged that said transfer destination discriminator is registered, transfer of the data from said terminal equipment to said transfer destination.

5. A network system having a plurality of nodes connected to a public switched network and a plurality of terminal equipments each connectable to one of said nodes, each of said node comprising:

a first memory for registering a discriminator specific to each terminal equipment belonging to a node of a transfer deliverer;

a second memory for registering a discriminator specific to a user of each terminal equipment for each terminal equipment belonging to said transfer deliverer node;

means for receiving, in response to a data communication request from said terminal equipment belonging to said transfer deliverer node, said discriminator of said terminal equipment and said discriminator of a user of said terminal equipment, respectively sent from said terminal equipment;

means for judging if said received discriminator of said terminal equipment is being registered in said first memory;

means for judging whether said received discriminator of said user of said terminal equipment is registered in said second memory as a discriminator of said user of said terminal equipment;

means for determining, in response to judgment results, whether a data transfer from said terminal equipment is permitted or not;

a third memory for registering information indicating whether a terminal equipment at a data transfer destination is to be restricted or not, for each said discriminator of said user; and a fourth memory for registering a discriminator of a terminal equipment at a data transfer destination, for each said discriminator of said user registered as requesting a transfer destination restriction, wherein said determining means includes means for judging, if both of said judging means judge that said discriminator of said terminal equipment and said discriminator of the user of said terminal equipment are registered, in response to said judgements, whether the transfer destination restriction is to be made by searching said information registered in said third memory corresponding to said user discriminator, means for judging, whether it is judged that the transfer destination restriction is made, if said transfer destination discriminator sent from said terminal equipment is registered in said forth memory, and means for permitting, if it is judged that said transfer destination discriminator is being said transfer of the data from said terminal equipment to said transfer destination.

6. A network system according to claim 5, wherein said determining means further comprising means for permitting, if it is judged from the search result of said third memory that the transfer destination restriction is not made for said user discriminator, transfer of the data from said terminal equipment to a transfer destination identified by said transfer destination discriminator.

7. A method of data transfer, in a network system having a plurality of nodes connected to a public switched network and a plurality of terminal equipments each connectable to one of said nodes, comprising the steps performed by each of said nodes of:

registering a discriminator specific to each terminal equipment belonging to a transfer deliverer node in a first memory;

registering a discriminator specific to a user of each terminal equipment in a second memory for each terminal equipment belonging to said transfer deliverer node;

storing traffic information in a third memory, the traffic information being representative of an estimated traffic obtained in accordance with past data transferred between the transfer deliverer node and a transfer destination node;

storing communication toll information in a fourth memory, the communication toll information being provided for each of a plurality of types of circuits each having a different traffic capacity and being set between the transfer deliverer node and the transfer destination node;

judging whether said received discriminator of said terminal equipment is registered in said first memory;

judging whether said received discriminator of a user of said terminal equipment is registered in said second memory as a discriminator of the user of said terminal equipment;

in response to said judgment results, determining whether a data transfer from said terminal equipment is permitted or not; and setting a circuit between the transfer deliverer node and the transfer destination node selected from said plurality of types of circuits for transferring data from a terminal equipment via the transfer deliverer node to the transfer destination node, in accordance with said traffic information and said communication toll information stored in said third and fourth memories.

8. A network system having a plurality of nodes connected to a public switched network and a plurality of terminal equipments each connectable to one of said nodes, each of said nodes comprising:

a first memory for registering a discriminator specific to each terminal equipment belonging to a node of a transfer deliverer node;

a second memory for registering a discriminator specific to a user of each terminal equipment for each terminal equipment belonging to said transfer deliverer node;

a third memory for storing traffic information, the traffic information being representative of an estimated traffic obtained in accordance with past data transferred between the transfer deliverer node and a transfer destination node;

a fourth memory for storing communication toll information, the communication toll information being provided for each of a plurality of types of circuits each having a different traffic capacity and being set between the transfer deliverer node and the transfer destination node;

means for receiving, in response to a data communication request from said terminal equipment belonging to said transfer deliverer node, said discriminator of a user of said terminal equipment, respectively sent from said terminal equipment;

means for judging whether said received discriminator of said terminal equipment is registered in said first memory;

means for judging whether said received discriminator of said user of said terminal equipment is registered in said second memory as a discriminator of the user of said terminal equipment;

means for determining, in response to said judgment results, if a data transfer from said terminal equipment is permitted or not; and means for setting a circuit between the transfer deliverer node and the transfer destination node selected from said plurality of types of circuits for transferring data from a terminal equipment via the transfer deliverer node to the transfer destination node, in accordance with said traffic information and said communication toll information stored in said third and fourth memories.

* * * * *